United States Patent [19]

Yeh

[11] Patent Number: 5,175,803
[45] Date of Patent: Dec. 29, 1992

[54] METHOD AND APPARATUS FOR DATA PROCESSING AND WORD PROCESSING IN CHINESE USING A PHONETIC CHINESE LANGUAGE

[76] Inventor: Victor C. Yeh, 903 Pheasant Hollow Dr., Plainsboro, N.J. 08536

[21] Appl. No.: 870,472

[22] Filed: Jun. 9, 1986

Related U.S. Application Data

[63] Continuation-in-part of Ser. No. 745,302, Jun. 14, 1985.

[51] Int. Cl.⁵ .............................................. G06F 15/38
[52] U.S. Cl. .................................. 395/100; 400/110; 395/110; 395/144
[58] Field of Search ... 369/200 MS File, 900 MS File; 364/918.419, 919; 360/365 R; 434/156; 300/712; 345/110, 144

[56] References Cited

U.S. PATENT DOCUMENTS

| | | |
|---|---|---|
| 1,169,739 | 1/1916 | Allard . |
| 1,204,326 | 11/1916 | Stickney . |
| 1,549,621 | 8/1925 | Stickney . |
| 1,549,622 | 8/1925 | Stickney . |
| 1,687,939 | 8/1928 | Jones . |
| 2,412,777 | 12/1946 | Kao . |
| 2,427,214 | 10/1947 | Kao . |
| 2,526,633 | 8/1950 | Brumbaugh . |
| 2,613,795 | 8/1952 | Yutang . |
| 2,625,251 | 1/1953 | Kong . |
| 2,950,800 | 8/1960 | Caldwell . |
| 3,100,036 | 8/1963 | Toriumi et al. . |
| 3,199,446 | 8/1965 | Schaaf . |
| 3,631,956 | 1/1972 | Choi . |
| 3,754,459 | 8/1973 | Coleman et al. . |
| 3,809,203 | 5/1974 | Ogawa et al. . |
| 3,809,204 | 5/1974 | Ogawa . |
| 3,820,644 | 6/1974 | Yeh . |
| 3,852,720 | 12/1974 | Park . |
| 3,950,734 | 4/1976 | Li . |
| 4,051,606 | 10/1977 | Tozo . |
| 4,064,983 | 12/1977 | Inose et al. . |
| 4,079,482 | 3/1978 | Yeh . |

(List continued on next page.)

FOREIGN PATENT DOCUMENTS

0130941 1/1985 European Pat. Off. .
3142138 5/1983 Fed. Rep. of Germany .
3520002 12/1985 Fed. Rep. of Germany .

(List continued on next page.)

OTHER PUBLICATIONS

Jack Kai-Tung Huang, "The Input and Output of Chinese and Japanese Characters", Computer, vol. 18, No. 1, Jan./85, pp. 18-24.

(List continued on next page.)

*Primary Examiner*—Andrew J. James
*Attorney, Agent, or Firm*—Ostrolenk, Faber, Gerb & Soffen

[57] ABSTRACT

A method and apparatus for data processing and word processing in the Chinese language. A Phonetic Chinese Language (PCL) is defined in which any ideogram can be unambiguously represented by a Phonetic Chinese Word (PCW) no more than four characters in length, each word being composed of letters selected from a defined set of letters that can each be uniquely represented by a 7-bit digital code. Each PCW represents one and only one ideogram and provides the full sound and tone information required to pronounce it. Ambiguities caused by homonyms and homotones are avoided. PCL words are translated into their corresponding ideograms and vice versa by means of a stored monosyllabic dictionary. A method for unambiguously separating a polysyllabic PCL character string into separate words is also provided, which makes it unnecessary to employ a polysyllabic dictionary. Also disclosed is a method of forming an alphagrammic listing from PCL character strings by separating the strings into separate characters and listing them in alphabetical order, provided that homotones and identical ideograms are grouped together even if strict alphabetical ordering of the string would have separated them. The disclosure also includes a keyboard adapted for efficiently entering PCL characters for processing.

33 Claims, 27 Drawing Sheets

| TS / Q | 1 CV | 2 CSV | 3 SV | 4 V |
|---|---|---|---|---|
| 1 ∅ | CV | CSV | ✶SV | ✶V |
| 2 C | CVC | CSVC | ✶SVC | ✶VC |
| 3 Z | CVZ | CSVZ | ✶SVZ | ✶VZ |
| 4 V | CVV | CSVV | ✶SVV | ✶VV |
| 5 S | CVS | CSVS | ✶SVS | ✶VS |

U.S PATENTS DOCUMENTS

| | | |
|---|---|---|
| 4,096,934 | 6/1978 | Kirmser et al. |
| 4,146,337 | 3/1979 | Li |
| 4,173,753 | 11/1979 | Chou |
| 4,187,031 | 2/1980 | Yeh |
| 4,251,871 | 2/1981 | Yu |
| 4,278,838 | 7/1981 | Antonov ........................ 381/52 |
| 4,294,550 | 8/1981 | Wang |
| 4,327,421 | 4/1982 | Wang |
| 4,365,235 | 12/1982 | Greanias et al. |
| 4,484,305 | 11/1984 | Ho ........................ 364/900 |
| 4,484,305 | 11/1984 | Ho ........................ 364/900 |
| 4,500,872 | 2/1985 | Huang ........................ 340/365 R |
| 4,531,119 | 7/1985 | Nakayama et al. ........................ 340/712 |
| 4,544,276 | 10/1985 | Horodeck ........................ 364/900 |
| 4,565,459 | 1/1986 | DiLucia |
| 4,580,241 | 4/1986 | Kucera ........................ 364/418 |
| 4,609,357 | 9/1986 | Clegg ........................ 434/156 |
| 4,674,066 | 6/1987 | Kucera ........................ 364/419 |

FOREIGN PATENT DOCUMENTS

| | | |
|---|---|---|
| 3505291 | 8/1986 | Fed. Rep. of Germany |
| WO82/00442 | 2/1982 | PCT Int'l Appl. |
| 2076572 | 12/1981 | United Kingdom |
| 2121220 | 12/1983 | United Kingdom |
| 2158776 | 2/1984 | United Kingdom |

OTHER PUBLICATIONS

Yeh, Victor C. and Yuan Xiaoyuan, Phonetic Chinese Languages-A Tone-Based Natural Language, Proceedings of 1983 International Conference on Chinese Information Processing, Oct. 12-14, 1983, Beijing (In Chinese).

Attachment B1, Phonetic Methods.

Parks, China's quest, The Record, Apr. 27, 1982 (Bergen/Passaic/Hudson Counties, New Jersey).

Another Great Wall, The Economist, Oct. 13, 1984, p. 103.

Code of Chinese Graphic Character Set For Info. Interchange, GB-2312-80, Nat. Standard, The Rep. of China, 1981.

Stepanek, Microcomputers in China, The China Business Review, May-Jun. 1984.

Chinese Made Simple, The Tower, Oct. 10, 1984, vol. XLII, Issue 6.

Mercatanti, Learning Chinese, The Princeton Pocket, Sep. 7, 1984.

Typing Chinese, Japanese, and Korean by Joseph D. Becker, pp. 27-34, Computer, vol. 18, Jan. 1985, No. 1, Los Alamitos, Calif.

The Phonetic Encoding of Word-Components for the Computer Input of Chinese Characters, by Willis K. King, and Tien Chi Chen, pp. 122-126, 3rd USA-Japan Computer Conference, 1978.

NEC Research and Development, 1985, H. Ishiguro et al.: "Input Means for Workstations".

American Federation of Information Processing, Oct. 3-5, 1972, pp. 291-295, Chan H. Yeh: A Chinese Typewriter and Teletypewriter System.

Computer, vol. 18, No. 5, May 1985, M. Morita: Japanese Text-Input System.

Information Processing 80, 1980, pp. 139-142, K. Kodama et al.: The Japanese Word Processor JW-10.

IBM Technical Disclosure Bulletin, vol. 26, No. 3A, Aug. 1983, K. Kawai: Multiple Kana/Kanji Conversion Method.

| Q \ TS | | 1<br>CV | 2<br>CSV | 3<br>SV | 4<br>V |
|---|---|---|---|---|---|
| 1 | ø | CV | CSV | ✳SV | ✳V |
| 2 | C | CVC | CSVC | ✳SVC | ✳VC |
| 3 | Z | CVZ | CSVZ | ✳SVZ | ✳VZ |
| 4 | V | CVV | CSVV | ✳SVV | ✳VV |
| 5 | S | CVS | CSVS | ✳SVS | ✳VS |

FIG. 2.

PHONETIC CHINESE ALPHABET (PCA)  85  PYXYXX ZhUX 弥木5 (P23)

《拼音中文》字母全表

| | CONSONANTS | | ** 25 ** | | 声母 |
|---|---|---|---|---|---|
| Short | 1 ㄅ b | 2 ㄆ p | 3 ㄇ m | 4 ㄈ f | 5 ㄉ d | 6 ㄊ t | 7 ㄋ n | 8 ㄌ l | 9 ㄍ g | 10 ㄎ k | 11 ㄏ h |
| Long | 12 ㄐ j | 13 ㄑ q | 14 ㄒ x | 15 ㄓ zh | 16 ㄔ ch | 17 ㄕ sh | 18 ㄖ r | 19 ㄗ z | 20 ㄘ c | 21 ㄙ s | 22 ㄧ 0 | 83 ㄚ Y | 84 ㄨ W | 85 ㄩ Yü |

| Tone | VOWELTONES | | ** 60 ** | | 韵母 |
|---|---|---|---|---|---|
| (1) | 23 ㄚ a | 27 ㄦ i/- | 31 ㄟ ei | 35 ㄛ o/e | 39 ㄨ u | 43 ㄞ ai | 47 ㄩ ü | 51 ㄡ ou | 55 ㄠ ao | 59 ㄣ en | 63 ㄥ eng | 67 ㄢ an | 71 ㄨㄥ ong | 75 ㄤ ang | 79 er/i/- |
| (2) | 24 | 28 | 32 | 36 | 40 | 44 | 48 | 52 | 56 | 60 | 64 | 68 | 72 | 76 | 80 |
| (3) | 25 | 29 | 33 | 37 | 41 | 45 | 49 | 53 | 57 | 61 | 65 | 69 | 73 | 77 | 81 |
| (4) | 26 | 30 | 34 | 38 | 42 | 46 | 50 | 54 | 58 | 62 | 66 | 70 | 74 | 78 | 82 |

FIG. 3a Table of Speech Sound of Peking Dialect

| | a | o | e | -i | er | ai | ei | ao | ou | an | en | ang | eng | ong |
|---|---|---|---|---|---|---|---|---|---|---|---|---|---|---|
| | a | o | e | | er | ai | ei | ao | ou | an | en | ang | eng | |
| b | ba | bo | | | | bai | bei | bao | | ban | ben | bang | beng | |
| p | pa | po | | | | pai | pei | pao | pou | pan | pen | pang | peng | |
| m | ma | mo | | | | mai | mei | mao | mou | man | men | mang | meng | |
| f | fa | fo | | | | | fei | | fou | fan | fen | fang | feng | |
| d | da | | de | | | dai | dei | dao | dou | dan | | dang | deng | dong |
| t | ta | | te | | | tai | | tao | tou | tan | | tang | teng | tong |
| n | na | | ne | | | nai | nei | nao | nou | nan | nen | nang | neng | nong |
| l | la | | le | | | lai | lei | lao | lou | lan | | lang | leng | long |
| z | za | | ze | zi | | zai | zei | zao | zou | zan | zen | zang | zeng | zong |
| c | ca | | ce | ci | | cai | | cao | cou | can | cen | cang | ceng | cong |
| s | sa | | se | si | | sai | | sao | sou | san | sen | sang | seng | song |
| zh | zha | | zhe | zhi | | zhai | zhei | zhao | zhou | zhan | zhen | zhang | zheng | zhong |
| ch | cha | | che | chi | | chai | | chao | chou | chan | chen | chang | cheng | chong |
| sh | sha | | she | shi | | shai | shei | shao | shou | shan | shen | shang | sheng | |
| r | | | re | ri | | | | rao | rou | ran | ren | rang | reng | rong |
| g | ga | | ge | | | gai | gei | gao | gou | gan | gen | gang | geng | gong |
| k | ka | | ke | | | kai | kei | kao | kou | kan | ken | kang | keng | kong |
| h | ha | | he | | | hai | hei | hao | hou | han | hen | hang | heng | hong |
| | a | o | e | | er | ai | ei | ao | ou | an | en | ang | eng | |

FIG. 3b Table of Speech Sound of Peking Dialect

| i | ia | iao | ie | iou | ian | in | iang | ing | iong |
|---|---|---|---|---|---|---|---|---|---|
| bi |  | biao | bie |  | bian | bin |  | bing |  |
| pi |  | piao | pie |  | pian | pin |  | ping |  |
| mi |  | miao | mie | miu | mian | min |  | ming |  |
| di |  | diao | die | diu | dian |  |  | ding |  |
| ti |  | tiao | die |  | tian |  |  | ting |  |
| ni |  | niao | nie | niu | nian | nin | niang | ning |  |
| li | lia | liao | lie | liu | lian | lin | liang | ling |  |
| ji | jia | jiao | jie | jiu | jian | jin | jiang | jing | jiong |
| qi | qia | qiao | qie | qiu | qian | qin | qiang | qing | qiong |
| xi | xia | xiao | xie | xiu | xian | xin | xiang | xing | xiong |
| yi | ya | yao | yie | you | yan | yin | yang | ying | yong |

2

FIG. 3c Table of Speech Sound of Peking Dialect

| | 3 | | | | | | | | | 4 | | | |
|---|---|---|---|---|---|---|---|---|---|---|---|---|---|
| | u | ua | uo | uai | uei | uan | uen | uang | ueng | ü | üe | üan | ün |
| | du | | duo | | duei | duan | dun | | | | | | |
| | tu | | tuo | | tui | tuan | tun | | | | | | |
| | nu | | nuo | | | nuan | | | | nü | nüe | | |
| | lu | | luo | | | luan | lun | | | lü | lüe | | |
| | zu | | zuo | | zui | zuan | zun | | | | | | |
| | cu | | cuo | | cui | cuan | cun | | | | | | |
| | su | | suo | | sui | suan | sun | | | | | | |
| | zhu | zhua | zhuo | zhuai | zhui | zhuan | zhun | zhuang | | | | | |
| | chu | chua | chuo | chuai | chui | chuan | chun | chuang | | | | | |
| | shu | shua | shuo | shuai | shui | shuan | shun | shuang | | | | | |
| | ru | rua | ruo | | rui | ruan | run | | | | | | |
| | | | | | | | | | | ju | jue | juan | jun |
| | | | | | | | | | | qu | que | quan | qun |
| | | | | | | | | | | xu | xue | xuan | xun |
| | gu | gua | guo | guai | gui | guan | gun | guang | | | | | |
| | ku | kua | kuo | kuai | kui | kuan | kun | kuang | | | | | |
| | hu | hua | huo | huai | hui | huan | hun | huang | | | | | |
| | wu | wa | wo | wai | wei | wan | wen | wang | weng | yu | yue | yuan | yun |

FIG. 4A.

| ㄅㄆㄇ<br>ㄐㄗㄚ | | ←—a—→<br>23 24 25 26<br>ㄚ ㄜ ㄨ ㄞ | ←—i—→<br>27 28 29 30<br>ㄐㄧ ㄐㄩ ㄐㄨ ㄐㄩ | ←—ei—→<br>31 32 33 34<br>ㄥ ㄤ ㄣ ㄢ | ←—o/e—→<br>35 36 37 38<br>ㄛ ㄜ ㄡ ㄠ |
|---|---|---|---|---|---|
| b 1 | ㄅ | ㄅㄚ ㄅㄜ ㄅㄨ ㄅㄞ | ㄅㄐ ㄅㄐ ㄅㄐ ㄅㄐ | ㄅㄥ -- ㄅㄣ ㄅㄢ | ㄅㄛ ㄅㄜ ㄅㄡ ㄅㄠ |
| p 2 | ㄆ | ㄆㄚ ㄆㄜ -- ㄆㄞ | ㄆㄐ ㄆㄐ ㄆㄐ ㄆㄐ | ㄆㄥ ㄆㄤ -- ㄆㄢ | ㄆㄛ ㄆㄜ ㄆㄡ ㄆㄠ |
| m 3 | ㄇ | ㄇㄚ ㄇㄜ ㄇㄨ ㄇㄞ | ㄇㄐ ㄇㄐ ㄇㄐ ㄇㄐ | -- ㄇㄤ ㄇㄣ ㄇㄢ | ㄇㄛ ㄇㄜ ㄇㄡ ㄇㄠ |
| f 4 | ㄈ | ㄈㄚ ㄈㄜ ㄈㄨ ㄈㄞ | | ㄈㄥ ㄈㄤ ㄈㄣ ㄈㄢ | -- ㄈㄜ -- -- |
| d 5 | ㄉ | ㄉㄚ ㄉㄜ ㄉㄨ ㄉㄞ | ㄉㄐ ㄉㄐ ㄉㄐ ㄉㄐ | -- -- ㄉㄣ -- | ㄉㄛ ㄉㄜ -- -- |
| t 6 | ㄊ | ㄊㄚ ㄊㄜ ㄊㄨ ㄊㄞ | ㄊㄐ ㄊㄐ ㄊㄐ ㄊㄐ | | ㄊㄛ -- -- ㄊㄠ |
| n 7 | ㄋ | ㄋㄚ ㄋㄜ ㄋㄨ ㄋㄞ | ㄋㄐ ㄋㄐ ㄋㄐ ㄋㄐ | -- -- ㄋㄣ ㄋㄢ | ㄋㄛ ㄋㄜ -- ㄋㄠ |
| l 8 | ㄌ | ㄌㄚ ㄌㄜ ㄌㄨ ㄌㄞ | ㄌㄐ ㄌㄐ ㄌㄐ ㄌㄐ | ㄌㄥ ㄌㄤ ㄌㄣ ㄌㄢ | ㄌㄛ -- -- ㄌㄠ |
| g 9 | ㄍ | ㄍㄚ ㄍㄜ ㄍㄨ ㄍㄞ | | -- -- ㄍㄣ -- | ㄍㄛ ㄍㄜ ㄍㄡ ㄍㄠ |
| k 10 | ㄎ | ㄎㄚ -- ㄎㄨ ㄎㄞ | | ㄎㄥ -- -- -- | ㄎㄛ ㄎㄜ ㄎㄡ ㄎㄠ |
| h 11 | ㄏ | ㄏㄚ ㄏㄜ ㄏㄨ ㄏㄞ | | ㄏㄥ -- -- -- | ㄏㄛ ㄏㄜ ㄏㄡ ㄏㄠ |
| j 12 | ㄐ | ㄐㄚ ㄐㄜ ㄐㄨ ㄐㄞ | ㄐㄐ ㄐㄐ ㄐㄐ ㄐㄐ | ㄐㄥ ㄐㄤ ㄐㄣ ㄐㄢ | |
| q 13 | ㄑ | ㄑㄚ -- ㄑㄨ ㄑㄞ | ㄑㄐ ㄑㄐ ㄑㄐ ㄑㄐ | ㄑㄥ ㄑㄤ ㄑㄣ ㄑㄢ | |
| x 14 | ㄒ | ㄒㄚ ㄒㄜ -- ㄒㄞ | ㄒㄐ ㄒㄐ ㄒㄐ ㄒㄐ | ㄒㄥ ㄒㄤ ㄒㄣ ㄒㄢ | |
| zh 15 | ㄓ | ㄓㄚ ㄓㄜ ㄓㄨ ㄓㄞ | ㄓㄐ ㄓㄐ ㄓㄐ ㄓㄐ | -- -- -- ㄓㄢ | ㄓㄛ ㄓㄜ ㄓㄡ ㄓㄠ |
| ch 16 | ㄔ | ㄔㄚ ㄔㄜ ㄔㄨ ㄔㄞ | ㄔㄐ ㄔㄐ ㄔㄐ ㄔㄐ | -- -- -- -- | ㄔㄛ -- ㄔㄡ ㄔㄠ |
| sh 17 | ㄕ | ㄕㄚ -- ㄕㄨ ㄕㄞ | ㄕㄐ ㄕㄐ ㄕㄐ ㄕㄐ | -- ㄕㄤ -- -- | ㄕㄛ ㄕㄜ ㄕㄡ ㄕㄠ |
| r 18 | ㄖ | | -- -- -- ㄖㄐ | | -- -- ㄖㄡ ㄖㄠ |
| z 19 | ㄗ | ㄗㄚ ㄗㄜ ㄗㄨ -- | ㄗㄐ -- ㄗㄐ ㄗㄐ | -- ㄗㄤ -- -- | -- ㄗㄜ -- ㄗㄠ |
| c 20 | ㄘ | ㄘㄚ -- ㄘㄨ -- | ㄘㄐ ㄘㄐ ㄘㄐ ㄘㄐ | -- -- -- -- | -- -- -- ㄘㄠ |
| s 21 | ㄙ | ㄙㄚ -- ㄙㄨ ㄙㄞ | ㄙㄐ -- ㄙㄐ ㄙㄐ | -- -- -- -- | -- -- -- ㄙㄠ |
| 0 22 | ㄧ | ㄚ ㄜ ㄨ ㄞ | ㄐ ㄐ ㄐ ㄐ | ㄥ ㄤ ㄣ ㄢ | ㄛ ㄜ ㄡ ㄠ |
| i 83 | ㄧ | ㄧㄚ ㄧㄜ ㄧㄨ ㄧㄞ | ㄧㄐ ㄧㄐ ㄧㄐ ㄧㄐ | ㄧㄥ ㄧㄤ ㄧㄣ ㄧㄢ | |
| u 84 | ㄨ | ㄨㄚ ㄨㄜ ㄨㄨ ㄨㄞ | | ㄨㄥ ㄨㄤ ㄨㄣ ㄨㄢ | ㄨㄛ ㄨㄜ ㄨㄡ ㄨㄠ |
| ü 85 | ㄩ | | | ㄩㄥ -- ㄩㄣ ㄩㄢ | ㄩㄛ -- -- -- |

FIG. 4B

| ㄕㄚㄚ \ ㄉㄓㄔ | | | ← u → 39 40 41 42 ㄖ ㄗ ㄙ ㄢ | ← ai → 43 44 45 46 ㄆ ㄠ ㄡ ㄞ | ← ü → 47 48 49 50 ㄙ ㄠ ㄛ ㄜ | ← ou → 51 52 53 54 ㄩ ㄩ ㄤ ㄤ |
|---|---|---|---|---|---|---|
| b | 1 | B | Bㄖ Bㄗ Bㄙ Bㄢ | Bㄆ Bㄠ Bㄡ Bㄞ | | Pㄩ Pㄩ Pㄤ -- |
| p | 2 | P | Pㄖ Pㄗ Pㄙ Pㄢ | Pㄆ Pㄠ Pㄡ Pㄞ | | Pㄩ Pㄩ Pㄤ -- |
| m | 3 | 木 | -- 木ㄗ 木ㄙ 木ㄢ | 木ㄆ 木ㄠ 木ㄡ 木ㄞ | | 木ㄩ 木ㄩ 木ㄤ -- |
| f | 4 | ‡ | ‡ㄖ ‡ㄗ ‡ㄙ ‡ㄢ | | | -- -- ‡ㄤ -- |
| d | 5 | ㄉ | ㄉㄖ ㄉㄗ ㄉㄙ ㄉㄢ | ㄉㄆ -- ㄉㄡ ㄉㄞ | | ㄉㄩ -- ㄉㄤ ㄉㄤ |
| t | 6 | ㄊ | ㄊㄖ ㄊㄗ ㄊㄙ ㄊㄢ | ㄊㄆ -- ㄊㄡ ㄊㄞ | | ㄊㄩ ㄊㄩ ㄊㄤ ㄊㄤ |
| n | 7 | ㄋ | -- ㄋㄗ ㄋㄙ ㄋㄢ | -- -- ㄋㄡ ㄋㄞ | -- -- ㄋㄛ ㄋㄜ | -- -- -- ㄋㄤ |
| l | 8 | ㄌ | ㄌㄖ ㄌㄗ ㄌㄙ ㄌㄢ | -- ㄌㄠ -- ㄌㄞ | -- ㄌㄠ ㄌㄛ ㄌㄜ | ㄌㄩ ㄌㄩ ㄌㄤ ㄌㄤ |
| g | 9 | ㄍ | ㄍㄖ ㄍㄗ ㄍㄙ ㄍㄢ | ㄍㄆ -- ㄍㄡ ㄍㄞ | | ㄍㄩ -- ㄍㄤ ㄍㄤ |
| k | 10 | ㄎ | ㄎㄖ -- ㄎㄙ ㄎㄢ | ㄎㄆ -- ㄎㄡ ㄎㄞ | | ㄎㄩ -- ㄎㄤ ㄎㄤ |
| h | 11 | H | Hㄖ Hㄗ Hㄙ Hㄢ | Hㄆ Hㄠ Hㄡ Hㄞ | | Hㄩ Hㄩ Hㄤ Hㄤ |
| j | 12 | 4 | | | 4ㄙ 4ㄠ 4ㄛ 4ㄜ | 4ㄩ -- 4ㄤ 4ㄤ |
| q | 13 | ㄑ | | | ㄑㄙ ㄑㄠ ㄑㄛ ㄑㄜ | ㄑㄩ ㄑㄩ ㄑㄤ -- |
| x | 14 | 9 | | | 9ㄙ 9ㄠ 9ㄛ 9ㄜ | 9ㄩ -- 9ㄤ 9ㄤ |
| zh | 15 | ㄓ | ㄓㄖ ㄓㄗ ㄓㄙ ㄓㄢ | ㄓㄆ ㄓㄠ ㄓㄡ ㄓㄞ | | ㄓㄩ ㄓㄩ ㄓㄤ ㄓㄤ |
| ch | 16 | ㄔ | ㄔㄖ ㄔㄗ ㄔㄙ ㄔㄢ | ㄔㄆ ㄔㄠ ㄔㄡ ㄔㄞ | | ㄔㄩ ㄔㄩ ㄔㄤ ㄔㄤ |
| sh | 17 | ㄕ | ㄕㄖ ㄕㄗ ㄕㄙ ㄕㄢ | ㄕㄆ -- ㄕㄡ ㄕㄞ | | ㄕㄩ ㄕㄩ ㄕㄤ ㄕㄤ |
| r | 18 | 日 | -- 日ㄗ 日ㄙ 日ㄢ | | | -- 日ㄩ -- 日ㄤ |
| z | 19 | ㄗ | ㄗㄖ ㄗㄗ ㄗㄙ -- | ㄗㄆ -- ㄗㄡ ㄗㄞ | | ㄗㄩ -- ㄗㄤ ㄗㄤ |
| c | 20 | ㄘ | ㄘㄖ ㄘㄗ -- ㄘㄢ | ㄘㄆ ㄘㄠ ㄘㄡ ㄘㄞ | | -- -- -- ㄘㄤ |
| s | 21 | ㄙ | ㄙㄖ ㄙㄗ -- ㄙㄢ | ㄙㄆ -- -- ㄙㄞ | | ㄙㄩ -- ㄙㄤ ㄙㄤ |
| 0 | 22 | ㄒ | ㄖ ㄗ ㄙ ㄢ | ㄆ ㄠ ㄡ ㄞ | ㄙ ㄠ ㄛ ㄜ | ㄩ -- ㄤ ㄤ |
| i | 83 | ㄧ | | | | ㄧㄩ ㄧㄩ ㄧㄤ ㄧㄤ |
| u | 84 | ㄨ | ㄨㄖ ㄨㄗ ㄨㄙ ㄨㄢ | ㄨㄆ ㄨㄠ ㄨㄡ ㄨㄞ | | |
| ü | 85 | ㄩ | | | ㄩㄙ ㄩㄠ ㄩㄛ ㄩㄜ | |

FIG. 4C.

| ㄐㄚㄚ / ㄉㄐㄔ | | ←─ ao ─→ 55 56 57 58 ㄓ ㄓ ㄓ ㄓ | ←─ en ─→ 59 60 61 62 ㄨ ㄨ ㄨ ㄨ | ←─ eng ─→ 63 64 65 66 ㄚ ㄚ ㄚ ㄚ | ←─ an ─→ 67 68 69 70 ㄣ ㄣ ㄣ ㄣ |
|---|---|---|---|---|---|
| b 1 ㄅ<br>p 2 ㄆ<br>m 3 ㄇ<br>f 4 ㄈ | | ㄅㄓ ㄅㄓ ㄅㄓ ㄅㄓ<br>ㄆㄓ ㄆㄓ ㄆㄓ ㄆㄓ<br>ㄇㄓ ㄇㄓ ㄇㄓ ㄇㄓ<br>ㄈㄓ ㄈㄓ ㄈㄓ ㄈㄓ | ㄅㄨ -- ㄅㄨ ㄅㄨ<br>ㄆㄨ ㄆㄨ -- ㄆㄨ<br>ㄇㄨ ㄇㄨ -- ㄇㄨ<br>ㄈㄨ ㄈㄨ ㄈㄨ ㄈㄨ | ㄅㄚ ㄅㄚ ㄅㄚ ㄅㄚ<br>ㄆㄚ ㄆㄚ ㄆㄚ ㄆㄚ<br>ㄇㄚ ㄇㄚ ㄇㄚ ㄇㄚ<br>ㄈㄚ ㄈㄚ ㄈㄚ ㄈㄚ | ㄅㄣ -- ㄅㄣ ㄅㄣ<br>ㄆㄣ ㄆㄣ -- ㄆㄣ<br>ㄇㄣ ㄇㄣ ㄇㄣ ㄇㄣ<br>ㄈㄣ ㄈㄣ ㄈㄣ ㄈㄣ |
| d 5 ㄉ<br>t 6 ㄊ<br>n 7 ㄋ<br>l 8 ㄌ | | ㄉㄓ ㄉㄓ ㄉㄓ ㄉㄓ<br>ㄊㄓ ㄊㄓ ㄊㄓ ㄊㄓ<br>ㄋㄓ ㄋㄓ ㄋㄓ ㄋㄓ<br>ㄌㄓ ㄌㄓ ㄌㄓ ㄌㄓ | -- -- -- ㄉㄨ<br><br>-- -- -- ㄋㄨ<br> | ㄉㄚ -- ㄉㄚ ㄉㄚ<br>ㄊㄚ ㄊㄚ -- --<br>-- ㄋㄚ -- --<br>-- ㄌㄚ ㄌㄚ ㄌㄚ | ㄉㄣ -- ㄉㄣ ㄉㄣ<br>ㄊㄣ ㄊㄣ ㄊㄣ ㄊㄣ<br>ㄋㄣ ㄋㄣ ㄋㄣ ㄋㄣ<br>-- ㄌㄣ ㄌㄣ ㄌㄣ |
| g 9 ㄍ<br>k 10 ㄎ<br>h 11 ㄏ | | ㄍㄓ -- ㄍㄓ ㄍㄓ<br>ㄎㄓ -- ㄎㄓ ㄎㄓ<br>ㄏㄓ ㄏㄓ ㄏㄓ ㄏㄓ | ㄍㄨ ㄍㄨ ㄍㄨ ㄍㄨ<br>-- -- ㄎㄨ ㄎㄨ<br>-- ㄏㄨ ㄏㄨ ㄏㄨ | ㄍㄚ -- ㄍㄚ ㄍㄚ<br>ㄎㄚ -- -- --<br>ㄏㄚ ㄏㄚ -- ㄏㄚ | ㄍㄣ -- ㄍㄣ ㄍㄣ<br>ㄎㄣ -- ㄎㄣ ㄎㄣ<br>ㄏㄣ ㄏㄣ ㄏㄣ ㄏㄣ |
| j 12 ㄐ<br>q 13 ㄑ<br>x 14 ㄒ | | ㄐㄓ ㄐㄓ ㄐㄓ ㄐㄓ<br>ㄑㄓ ㄑㄓ ㄑㄓ ㄑㄓ<br>ㄒㄓ ㄒㄓ ㄒㄓ ㄒㄓ | ㄐㄨ -- ㄐㄨ ㄐㄨ<br>ㄑㄨ ㄑㄨ ㄑㄨ ㄑㄨ<br>ㄒㄨ ㄒㄨ -- ㄒㄨ | ㄐㄚ ㄐㄚ ㄐㄚ ㄐㄚ<br>ㄑㄚ ㄑㄚ ㄑㄚ ㄑㄚ<br>ㄒㄚ ㄒㄚ ㄒㄚ ㄒㄚ | ㄐㄣ -- ㄐㄣ ㄐㄣ<br>ㄑㄣ ㄑㄣ ㄑㄣ ㄑㄣ<br>ㄒㄣ -- ㄒㄣ ㄒㄣ |
| zh 15 ㄓ<br>ch 16 ㄔ<br>sh 17 ㄕ<br>r 18 ㄖ | | ㄓㄓ ㄓㄓ ㄓㄓ ㄓㄓ<br>ㄔㄓ ㄔㄓ ㄔㄓ ㄔㄓ<br>ㄕㄓ ㄕㄓ ㄕㄓ ㄕㄓ<br>-- ㄖㄓ ㄖㄓ ㄖㄓ | ㄓㄨ -- ㄓㄨ ㄓㄨ<br>ㄔㄨ ㄔㄨ ㄔㄨ ㄔㄨ<br>ㄕㄨ ㄕㄨ ㄕㄨ ㄕㄨ<br>-- ㄖㄨ ㄖㄨ ㄖㄨ | ㄓㄚ -- ㄓㄚ ㄓㄚ<br>ㄔㄚ ㄔㄚ ㄔㄚ ㄔㄚ<br>ㄕㄚ ㄕㄚ ㄕㄚ ㄕㄚ<br>ㄖㄚ ㄖㄚ -- -- | ㄓㄣ -- ㄓㄣ ㄓㄣ<br>ㄔㄣ ㄔㄣ ㄔㄣ ㄔㄣ<br>ㄕㄣ -- ㄕㄣ ㄕㄣ<br>-- ㄖㄣ ㄖㄣ -- |
| z 19 ㄗ<br>c 20 ㄘ<br>s 21 ㄙ | | ㄗㄓ ㄗㄓ ㄗㄓ ㄗㄓ<br>ㄘㄓ ㄘㄓ ㄘㄓ ㄘㄓ<br>ㄙㄓ -- ㄙㄓ ㄙㄓ | -- -- ㄗㄨ ㄗㄨ<br>ㄘㄨ ㄘㄨ -- --<br>ㄙㄨ -- -- -- | ㄗㄚ -- -- ㄗㄚ<br>ㄘㄚ ㄘㄚ -- ㄘㄚ<br>ㄙㄚ -- -- -- | ㄗㄣ ㄗㄣ ㄗㄣ ㄗㄣ<br>ㄘㄣ ㄘㄣ ㄘㄣ ㄘㄣ<br>ㄙㄣ -- ㄙㄣ ㄙㄣ |
| 0 22 | ㄭ | ㄓ ㄓ ㄓ ㄓ | ㄨ - - ㄨ | ㄚ ㄚ ㄚ ㄚ | ㄣ - - ㄣ |
| i 83 ㄧ<br>u 84 ㄨ<br>ü 85 ㄩ | | ㄧㄓ ㄧㄓ ㄧㄓ ㄧㄓ<br><br>ㄩㄓ ㄩㄓ ㄩㄓ ㄩㄓ | ㄧㄨ ㄧㄨ ㄧㄨ ㄧㄨ<br>ㄨㄨ ㄨㄨ ㄨㄨ ㄨㄨ<br>ㄩㄨ ㄩㄨ ㄩㄨ ㄩㄨ | ㄧㄚ ㄧㄚ ㄧㄚ ㄧㄚ<br>ㄨㄚ ㄨㄚ ㄨㄚ ㄨㄚ<br>ㄩㄚ ㄩㄚ ㄩㄚ ㄩㄚ | ㄧㄣ ㄧㄣ ㄧㄣ ㄧㄣ<br>ㄨㄣ ㄨㄣ ㄨㄣ ㄨㄣ<br>ㄩㄣ ㄩㄣ ㄩㄣ ㄩㄣ |

FIG. 4D

| ㄅㄆㄇ / ㄧㄨㄩ | | ←ong→ 71 72 73 74 ㄓ ㄓ ㄓ ㄓ | ←ang→ 75 76 77 78 ㄏ ㄐ ㄑ ㄒ | ←er→ 79 80 81 82 ㄕ ㄖ ㄗ ㄘ | ←i/0→ 79 80 81 82 ㄕ ㄖ ㄗ ㄘ |
|---|---|---|---|---|---|
| b  1  ㄅ | | | ㄅㄏ -- ㄅㄗ ㄅㄘ | | -- -- ㄅㄗ ㄅㄘ |
| p  2  ㄆ | | | ㄆㄏ ㄆㄐ ㄆㄗ ㄆㄘ | | ㄆㄕ ㄆㄖ ㄆㄗ ㄆㄘ |
| m  3  ㄇ | | | ㄇㄏ ㄇㄐ ㄇㄗ -- | | ㄇㄕ ㄇㄖ ㄇㄗ ㄇㄘ |
| f  4  ㄈ | | | ㄈㄏ ㄈㄐ ㄈㄗ ㄈㄘ | | |
| d  5  ㄉ | | ㄉㄓ -- ㄉㄓ ㄉㄓ | ㄉㄏ -- ㄉㄗ ㄉㄘ | | ㄉㄕ ㄉㄖ ㄉㄗ ㄉㄘ |
| t  6  ㄊ | | ㄊㄓ ㄊㄓ ㄊㄓ ㄊㄓ | ㄊㄏ ㄊㄐ ㄊㄗ ㄊㄘ | | ㄊㄕ ㄊㄖ -- ㄊㄘ |
| n  7  ㄋ | | ㄋㄓ ㄋㄓ -- ㄋㄓ | ㄋㄏ ㄋㄐ ㄋㄗ ㄋㄘ | | -- ㄋㄖ ㄋㄗ ㄋㄘ |
| l  8  ㄌ | | ㄌㄓ ㄌㄓ ㄌㄓ ㄌㄓ | ㄌㄏ ㄌㄐ ㄌㄗ ㄌㄘ | | ㄌㄕ ㄌㄖ ㄌㄗ ㄌㄘ |
| g  9  ㄍ | | ㄍㄓ -- ㄍㄓ ㄍㄓ | ㄍㄏ -- ㄍㄗ ㄍㄘ | | |
| k  10 ㄎ | | ㄎㄓ -- ㄎㄓ ㄎㄓ | ㄎㄏ ㄎㄐ -- ㄎㄘ | | |
| h  11 ㄏ | | ㄏㄓ ㄏㄓ ㄏㄓ ㄏㄓ | ㄏㄏ ㄏㄐ -- ㄏㄘ | | |
| j  12 ㄐ | | ㄐㄓ -- ㄐㄓ -- | ㄐㄏ -- ㄐㄗ ㄐㄘ | | ㄐㄕ ㄐㄖ ㄐㄗ ㄐㄘ |
| q  13 ㄑ | | -- ㄑㄓ -- -- | ㄑㄏ ㄑㄐ ㄑㄗ ㄑㄘ | | ㄑㄕ ㄑㄖ ㄑㄗ ㄑㄘ |
| x  14 ㄒ | | ㄒㄓ ㄒㄓ -- ㄒㄓ | ㄒㄏ ㄒㄐ ㄒㄗ ㄒㄘ | | ㄒㄕ ㄒㄖ ㄒㄗ ㄒㄘ |
| zh 15 ㄓ | | ㄓㄓ -- ㄓㄓ ㄓㄓ | ㄓㄏ -- ㄓㄗ ㄓㄘ | | ㄓㄕ ㄓㄖ ㄓㄗ ㄓㄘ |
| ch 16 ㄔ | | ㄔㄓ ㄔㄓ ㄔㄓ ㄔㄓ | ㄔㄏ ㄔㄐ ㄔㄗ ㄔㄘ | | ㄔㄕ ㄔㄖ ㄔㄗ ㄔㄘ |
| sh 17 ㄕ | | ㄕㄓ ㄕㄓ ㄕㄓ ㄕㄓ | ㄕㄏ -- ㄕㄗ ㄕㄘ | | ㄕㄕ ㄕㄖ ㄕㄗ ㄕㄘ |
| r  18 ㄖ | | -- ㄖㄓ ㄖㄓ -- | ㄖㄏ ㄖㄐ ㄖㄗ ㄖㄘ | | |
| z  19 ㄗ | | ㄗㄓ -- ㄗㄓ ㄗㄓ | ㄗㄏ -- ㄗㄗ ㄗㄘ | | ㄗㄕ ㄗㄖ ㄗㄗ ㄗㄘ |
| c  20 ㄘ | | ㄘㄓ ㄘㄓ -- -- | ㄘㄏ ㄘㄐ -- -- | | ㄘㄕ ㄘㄖ ㄘㄗ ㄘㄘ |
| s  21 ㄙ | | ㄙㄓ -- ㄙㄓ ㄙㄓ | ㄙㄏ -- ㄙㄗ ㄙㄘ | | ㄙㄕ -- ㄙㄗ ㄙㄘ |
| 0  22 ㄛ | | | ㄏ ㄐ - ㄘ | ㄕ ㄖ ㄗ ㄘ | |
| i  83 ㄧ | | ㄧㄓ ㄧㄓ ㄧㄓ ㄧㄓ | ㄧㄏ ㄧㄐ ㄧㄗ ㄧㄘ | | ㄧㄕ ㄧㄖ ㄧㄗ ㄧㄘ |
| u  84 ㄨ | | | ㄨㄏ ㄨㄐ ㄨㄗ ㄨㄘ | | ㄨㄕ ㄨㄖ ㄨㄗ ㄨㄘ |
| ü  85 ㄩ | | ㄩㄓ ㄩㄓ ㄩㄓ ㄩㄓ | | | ㄩㄕ ㄩㄖ ㄩㄗ ㄩㄘ |

FIG. 4E

| ㄕㄇㄚ \ ㄉㄧㄓ | ← ia → 8323 8324 8325 8326 ㄧㄚ ㄧㄠ ㄧㄞ ㄧㄤ | ← ie → 8331 8332 8333 8334 ㄧㄥ ㄧㄝ ㄧㄝ ㄧㄝ | ← iu → 8327 8328 8329 8330 ㄧㄡ ㄧㄣ ㄧㄢ ㄧㄨ |
|---|---|---|---|
| b 1 ㄅ<br>p 2 ㄆ<br>m 3 ㄇ<br>f 4 ㄈ | | ㄅㄧㄥ ㄅㄧㄝ ㄅㄧㄝ ㄅㄧㄝ<br>ㄆㄧㄥ --- ㄆㄧㄝ ---<br>ㄇㄧㄥ --- --- ㄇㄧㄝ | <br><br>--- --- --- ㄇㄧㄨ |
| d 5 ㄉ<br>t 6 ㄊ<br>n 7 ㄋ<br>l 8 ㄌ | --- --- ㄉㄧㄞ ---<br><br><br>--- --- ㄌㄧㄞ --- | ㄉㄧㄥ ㄉㄧㄝ --- ---<br>ㄊㄧㄥ --- ㄊㄧㄝ ㄊㄧㄝ<br>ㄋㄧㄥ ㄋㄧㄝ --- ㄋㄧㄝ<br>--- ㄌㄧㄝ ㄌㄧㄝ ㄌㄧㄝ | ㄉㄧㄨ --- --- ---<br><br>ㄋㄧㄨ ㄋㄧㄣ ㄋㄧㄢ ㄋㄧㄨ<br>ㄌㄧㄨ ㄌㄧㄣ ㄌㄧㄢ ㄌㄧㄨ |
| g 9 ㄍ<br>k 10 ㄎ<br>h 11 ㄏ | | | |
| j 12 ㄐ<br>q 13 ㄑ<br>x 14 ㄒ | | | |
| zh 15 ㄓ<br>ch 16 ㄔ<br>sh 17 ㄕ<br>r 18 ㄖ | | | |
| z 19 ㄗ<br>c 20 ㄘ<br>s 21 ㄙ | | | |

FIG. 4F

| ㄕㄇㄚ \ ㄉㄧㄜ | ← iao → | | | | ← in → | | | | ← ing → | | | |
|---|---|---|---|---|---|---|---|---|---|---|---|---|
| | 8355 | 8356 | 8357 | 8358 | 8359 | 8360 | 8361 | 8362 | 8363 | 8364 | 8365 | 8366 |
| | ㄧㄠ | ㄧㄠˊ | ㄧㄠˇ | ㄧㄠˋ | ㄧㄣ | ㄧㄣˊ | ㄧㄣˇ | ㄧㄣˋ | ㄧㄥ | ㄧㄥˊ | ㄧㄥˇ | ㄧㄥˋ |
| b  1  ㄅ | ㄅㄧㄠ | --- | ㄅㄧㄠˇ | ㄅㄧㄠˋ | ㄅㄧㄣ | --- | --- | ㄅㄧㄣˋ | ㄅㄧㄥ | --- | ㄅㄧㄥˇ | ㄅㄧㄥˋ |
| p  2  ㄆ | ㄆㄧㄠ | ㄆㄧㄠˊ | ㄆㄧㄠˇ | ㄆㄧㄠˋ | ㄆㄧㄣ | ㄆㄧㄣˊ | ㄆㄧㄣˇ | ㄆㄧㄣˋ | ㄆㄧㄥ | ㄆㄧㄥˊ | --- | --- |
| m  3  ㄇ | ㄇㄧㄠ | ㄇㄧㄠˊ | ㄇㄧㄠˇ | ㄇㄧㄠˋ | --- | ㄇㄧㄣˊ | ㄇㄧㄣˇ | --- | --- | ㄇㄧㄥˊ | ㄇㄧㄥˇ | ㄇㄧㄥˋ |
| f  4  ㄈ | | | | | | | | | | | | |
| d  5  ㄉ | ㄉㄧㄠ | --- | --- | ㄉㄧㄠˋ | | | | | ㄉㄧㄥ | --- | ㄉㄧㄥˇ | ㄉㄧㄥˋ |
| t  6  ㄊ | ㄊㄧㄠ | ㄊㄧㄠˊ | ㄊㄧㄠˇ | ㄊㄧㄠˋ | | | | | ㄊㄧㄥ | ㄊㄧㄥˊ | ㄊㄧㄥˇ | ㄊㄧㄥˋ |
| n  7  ㄋ | --- | --- | ㄋㄧㄠˇ | ㄋㄧㄠˋ | --- | ㄋㄧㄣˊ | --- | --- | --- | ㄋㄧㄥˊ | ㄋㄧㄥˇ | ㄋㄧㄥˋ |
| l  8  ㄌ | ㄌㄧㄠ | ㄌㄧㄠˊ | ㄌㄧㄠˇ | ㄌㄧㄠˋ | --- | ㄌㄧㄣˊ | ㄌㄧㄣˇ | ㄌㄧㄣˋ | ㄌㄧㄥ | ㄌㄧㄥˊ | ㄌㄧㄥˇ | ㄌㄧㄥˋ |
| g  9  ㄍ | | | | | | | | | | | | |
| k 10  ㄎ | | | | | | | | | | | | |
| h 11  ㄏ | | | | | | | | | | | | |
| j 12  ㄐ | | | | | | | | | | | | |
| q 13  ㄑ | | | | | | | | | | | | |
| x 14  ㄒ | | | | | | | | | | | | |
| zh 15 ㄓ | | | | | | | | | | | | |
| ch 16 ㄔ | | | | | | | | | | | | |
| sh 17 ㄕ | | | | | | | | | | | | |
| r 18  ㄖ | | | | | | | | | | | | |
| z 19  ㄗ | | | | | | | | | | | | |
| c 20  ㄘ | | | | | | | | | | | | |
| s 21  ㄙ | | | | | | | | | | | | |

FIG. 4G.

| ㄕㄇㄚ \ ㄉㄧㄜ | ← i a n → 8367 8368 8369 8370 ㄧㄢˋ ㄧㄢˇ ㄧㄢˊ ㄧㄢ | ← i a n g → 8375 8376 8377 8378 ㄧㄤˋ ㄧㄤˇ ㄧㄤˊ ㄧㄤ | ← u a → 8423 8424 8425 8426 ㄨㄚˋ ㄨㄚˇ ㄨㄚˊ ㄨㄚ |
|---|---|---|---|
| b 1 ㄅ<br>p 2 ㄆ<br>m 3 ㄇ<br>f 4 ㄈ | ㄅㄧㄢˋ --- ㄅㄧㄢˊ ㄅㄧㄢ<br>ㄆㄧㄢˋ ㄆㄧㄢˇ ㄆㄧㄢˊ ㄆㄧㄢ<br>--- ㄇㄧㄢˇ ㄇㄧㄢˊ ㄇㄧㄢ | | |
| d 5 ㄉ<br>t 6 ㄊ<br>n 7 ㄋ<br>l 8 ㄌ | ㄉㄧㄢˋ ㄉㄧㄢˇ ㄉㄧㄢˊ ㄉㄧㄢ<br>ㄊㄧㄢˋ ㄊㄧㄢˇ ㄊㄧㄢˊ ㄊㄧㄢ<br>ㄋㄧㄢˋ ㄋㄧㄢˇ ㄋㄧㄢˊ ㄋㄧㄢ<br>--- ㄌㄧㄢˇ ㄌㄧㄢˊ ㄌㄧㄢ | --- ㄋㄧㄤˇ --- ㄋㄧㄤ<br>--- ㄌㄧㄤˇ ㄌㄧㄤˊ ㄌㄧㄤ | |
| g 9 ㄍ<br>k 10 ㄎ<br>h 11 ㄏ | | | ㄍㄨㄚˋ --- ㄍㄨㄚˊ ㄍㄨㄚ<br>ㄎㄨㄚˋ --- ㄎㄨㄚˊ ㄎㄨㄚ<br>ㄏㄨㄚˋ ㄏㄨㄚˇ --- ㄏㄨㄚ |
| j 12 ㄐ<br>q 13 ㄑ<br>x 14 ㄒ | | | |
| zh 15 ㄓ<br>ch 16 ㄔ<br>sh 17 ㄕ<br>r 18 ㄖ | | | ㄓㄨㄚˋ --- ㄓㄨㄚˊ ---<br><br>ㄕㄨㄚˋ --- ㄕㄨㄚˊ ---<br>--- ㄖㄨㄚˇ --- --- |
| z 19 ㄗ<br>c 20 ㄘ<br>s 21 ㄙ | | | |

FIG. 4H

| ㄉㄎㄓ / ㄐㄇㄇ | | ← ui → | | | | ← uo → | | | | ← uai → | | | |
|---|---|---|---|---|---|---|---|---|---|---|---|---|---|
| | | 8431 | 8432 | 8433 | 8434 | 8435 | 8436 | 8437 | 8438 | 8443 | 8444 | 8445 | 8446 |
| | | 山ㄥ | 山ㄣ | 山ㄈ | 山ㄅ | 山ㄉ | 山ㄩ | 山ㄅ | 山ㄊ | 山ㄨ | 山ㄨ | 山ㄨ | 山ㄨ |
| b | 1 | B | | | | | | | | | | | |
| p | 2 | P | | | | | | | | | | | |
| m | 3 | ㄇ | | | | | | | | | | | |
| f | 4 | ㄈ | | | | | | | | | | | |
| d | 5 | ㄉ | ㄉ山ㄥ | --- | --- | ㄉ山ㄅ | ㄉ山ㄉ | ㄉ山ㄩ | ㄉ山ㄅ | ㄉ山ㄊ | | | | |
| t | 6 | ㄊ | ㄊ山ㄥ | ㄊ山ㄣ | ㄊ山ㄈ | ㄊ山ㄅ | ㄊ山ㄉ | ㄊ山ㄩ | ㄊ山ㄅ | ㄊ山ㄊ | | | | |
| n | 7 | ㄋ | | | | | --- | ㄋ山ㄩ | --- | ㄋ山ㄊ | | | | |
| l | 8 | ㄌ | | | | | ㄌ山ㄉ | ㄌ山ㄩ | ㄌ山ㄅ | ㄌ山ㄊ | | | | |
| g | 9 | I | I山ㄥ | --- | I山ㄈ | I山ㄅ | I山ㄉ | I山ㄩ | I山ㄅ | I山ㄊ | I山ㄨ | --- | I山ㄨ | I山ㄨ |
| k | 10 | ㄎ | ㄎ山ㄥ | ㄎ山ㄣ | ㄎ山ㄈ | ㄎ山ㄅ | --- | --- | --- | ㄎ山ㄊ | --- | --- | ㄎ山ㄨ | ㄎ山ㄨ |
| h | 11 | H | H山ㄥ | H山ㄣ | H山ㄈ | H山ㄅ | H山ㄉ | H山ㄩ | H山ㄅ | H山ㄊ | --- | H山ㄨ | --- | H山ㄨ |
| j | 12 | ㄐ | | | | | | | | | | | | |
| q | 13 | ㄑ | | | | | | | | | | | | |
| x | 14 | ㄒ | | | | | | | | | | | | |
| zh | 15 | ㄓ | ㄓ山ㄥ | --- | --- | ㄓ山ㄊ | ㄓ山ㄉ | ㄓ山ㄩ | --- | --- | ㄓ山ㄨ | --- | ㄓ山ㄨ | ㄓ山ㄨ |
| ch | 16 | ㄔ | ㄔ山ㄥ | ㄔ山ㄣ | --- | --- | ㄔ山ㄉ | --- | --- | ㄔ山ㄊ | ㄔ山ㄨ | ㄔ山ㄨ | ㄔ山ㄨ | ㄔ山ㄨ |
| sh | 17 | ㄕ | --- | ㄕ山ㄣ | ㄕ山ㄈ | ㄕ山ㄅ | ㄕ山ㄉ | --- | --- | ㄕ山ㄊ | ㄕ山ㄨ | --- | ㄕ山ㄨ | ㄕ山ㄨ |
| r | 18 | B | --- | B山ㄣ | B山ㄈ | B山ㄅ | --- | B山ㄩ | --- | B山ㄊ | | | | |
| z | 19 | ㄗ | ㄗ山ㄥ | --- | ㄗ山ㄈ | ㄗ山ㄊ | ㄗ山ㄉ | ㄗ山ㄩ | ㄗ山ㄅ | ㄗ山ㄊ | | | | |
| c | 20 | ㄘ | ㄘ山ㄥ | --- | ㄘ山ㄈ | ㄘ山ㄊ | ㄘ山ㄉ | ㄘ山ㄩ | ㄘ山ㄅ | ㄘ山ㄊ | | | | |
| s | 21 | ㄙ | ㄙ山ㄥ | ㄙ山ㄣ | ㄙ山ㄈ | ㄙ山ㄅ | ㄙ山ㄉ | --- | ㄙ山ㄅ | --- | | | | |

FIG. 41.

| | | | ← uen → | | | | ← uan → | | | | ← uang → | | | |
|---|---|---|---|---|---|---|---|---|---|---|---|---|---|---|
| | | ㄉㄨㄛ | 8459 | 8460 | 8461 | 8462 | 8467 | 8468 | 8469 | 8470 | 8475 | 8476 | 8477 | 8478 |
| ㄕㄨㄚ | | | ㄨㄣ | ㄨㄣˊ | ㄨㄣˇ | ㄨㄣˋ | ㄨㄢ | ㄨㄢˊ | ㄨㄢˇ | ㄨㄢˋ | ㄨㄤ | ㄨㄤˊ | ㄨㄤˇ | ㄨㄤˋ |
| b | 1 | ㄅ | | | | | | | | | | | | |
| p | 2 | ㄆ | | | | | | | | | | | | |
| m | 3 | ㄇ | | | | | | | | | | | | |
| f | 4 | ㄈ | | | | | | | | | | | | |
| d | 5 | ㄉ | ㄉㄨㄣ | --- | ㄉㄨㄣˇ | ㄉㄨㄣˋ | --- | ㄉㄨㄢˊ | ㄉㄨㄢˇ | ㄉㄨㄢˋ | | | | |
| t | 6 | ㄊ | ㄊㄨㄣ | ㄊㄨㄣˊ | ㄊㄨㄣˇ | ㄊㄨㄣˋ | ㄊㄨㄢ | ㄊㄨㄢˊ | ㄊㄨㄢˇ | --- | | | | |
| n | 7 | ㄋ | ㄋㄨㄣ | --- | --- | ㄋㄨㄣˋ | --- | --- | ㄋㄨㄢˇ | --- | | | | |
| l | 8 | ㄌ | ㄌㄨㄣ | ㄌㄨㄣˊ | --- | ㄌㄨㄣˋ | --- | ㄌㄨㄢˊ | ㄌㄨㄢˇ | ㄌㄨㄢˋ | | | | |
| g | 9 | ㄍ | --- | --- | ㄍㄨㄣˇ | ㄍㄨㄣˋ | ㄍㄨㄢ | --- | ㄍㄨㄢˇ | ㄍㄨㄢˋ | ㄍㄨㄤ | --- | ㄍㄨㄤˇ | ㄍㄨㄤˋ |
| k | 10 | ㄎ | ㄎㄨㄣ | --- | ㄎㄨㄣˇ | ㄎㄨㄣˋ | ㄎㄨㄢ | --- | ㄎㄨㄢˇ | --- | ㄎㄨㄤ | ㄎㄨㄤˊ | ㄎㄨㄤˇ | ㄎㄨㄤˋ |
| h | 11 | ㄏ | ㄏㄨㄣ | ㄏㄨㄣˊ | --- | ㄏㄨㄣˋ | ㄏㄨㄢ | ㄏㄨㄢˊ | ㄏㄨㄢˇ | ㄏㄨㄢˋ | ㄏㄨㄤ | ㄏㄨㄤˊ | ㄏㄨㄤˇ | ㄏㄨㄤˋ |
| j | 12 | ㄐ | | | | | | | | | | | | |
| q | 13 | ㄑ | | | | | | | | | | | | |
| x | 14 | ㄒ | | | | | | | | | | | | |
| zh | 15 | ㄓ | ㄓㄨㄣ | --- | ㄓㄨㄣˇ | --- | ㄓㄨㄢ | --- | ㄓㄨㄢˇ | ㄓㄨㄢˋ | ㄓㄨㄤ | --- | ㄓㄨㄤˇ | ㄓㄨㄤˋ |
| ch | 16 | ㄔ | ㄔㄨㄣ | ㄔㄨㄣˊ | ㄔㄨㄣˇ | --- | ㄔㄨㄢ | ㄔㄨㄢˊ | ㄔㄨㄢˇ | ㄔㄨㄢˋ | ㄔㄨㄤ | ㄔㄨㄤˊ | ㄔㄨㄤˇ | ㄔㄨㄤˋ |
| sh | 17 | ㄕ | --- | --- | ㄕㄨㄣˇ | ㄕㄨㄣˋ | ㄕㄨㄢ | --- | --- | ㄕㄨㄢˋ | ㄕㄨㄤ | --- | ㄕㄨㄤˇ | --- |
| r | 18 | ㄖ | --- | --- | --- | ㄖㄨㄣˋ | --- | --- | ㄖㄨㄢˇ | --- | | | | |
| z | 19 | ㄗ | ㄗㄨㄣ | --- | ㄗㄨㄣˇ | --- | ㄗㄨㄢ | --- | ㄗㄨㄢˇ | ㄗㄨㄢˋ | | | | |
| c | 20 | ㄘ | ㄘㄨㄣ | ㄘㄨㄣˊ | ㄘㄨㄣˇ | ㄘㄨㄣˋ | ㄘㄨㄢ | ㄘㄨㄢˊ | --- | ㄘㄨㄢˋ | | | | |
| s | 21 | ㄙ | ㄙㄨㄣ | --- | ㄙㄨㄣˇ | --- | ㄙㄨㄢ | --- | --- | ㄙㄨㄢˋ | | | | |

FIG.4J

| ㄌㄒㄓ<br>ㄒㄚㄚ | | ← üe →<br>8531 8532 8533 8534<br>ㄐㄥ ㄐㄝ ㄐㄟ ㄐㄜ | ← ün →<br>8559 8560 8561 8562<br>ㄐㄨ ㄐㄩ ㄐㄡ ㄐㄡ | ← üan →<br>8567 8568 8569 8570<br>ㄐㄤ ㄐㄢ ㄐㄦ ㄐㄠ |
|---|---|---|---|---|
| b 1 ㄅ<br>p 2 ㄆ<br>m 3 ㄇ<br>f 4 ㄈ | | | | |
| d 5 ㄉ<br>t 6 ㄊ<br>n 7 ㄋ<br>l 8 ㄌ | | --- --- --- ㄋㄐㄝ<br>--- --- --- ㄌㄐㄝ | | |
| g 9 ㄍ<br>k 10 ㄎ<br>h 11 ㄏ | | | | |
| j 12 ㄐ<br>q 13 ㄑ<br>x 14 ㄒ | | ㄐㄐㄥ ㄐㄐㄝ ㄐㄐㄟ ㄐㄐㄜ<br>ㄑㄐㄥ ㄑㄐㄝ --- ㄑㄐㄜ<br>ㄒㄐㄥ ㄒㄐㄝ ㄒㄐㄟ ㄒㄐㄜ | ㄐㄐㄨ --- --- ㄐㄐㄡ<br>ㄑㄐㄨ ㄑㄐㄩ --- ---<br>ㄒㄐㄨ ㄒㄐㄩ --- ㄒㄐㄡ | ㄐㄐㄤ --- ㄐㄐㄦ ㄐㄐㄠ<br>ㄑㄐㄤ ㄑㄐㄢ ㄑㄐㄦ ㄑㄐㄠ<br>ㄒㄐㄤ ㄒㄐㄢ ㄒㄐㄦ ㄒㄐㄠ |
| zh 15 ㄓ<br>ch 16 ㄔ<br>sh 17 ㄕ<br>r 18 ㄖ | | | | |
| z 19 ㄗ<br>c 20 ㄘ<br>s 21 ㄙ | | | | |

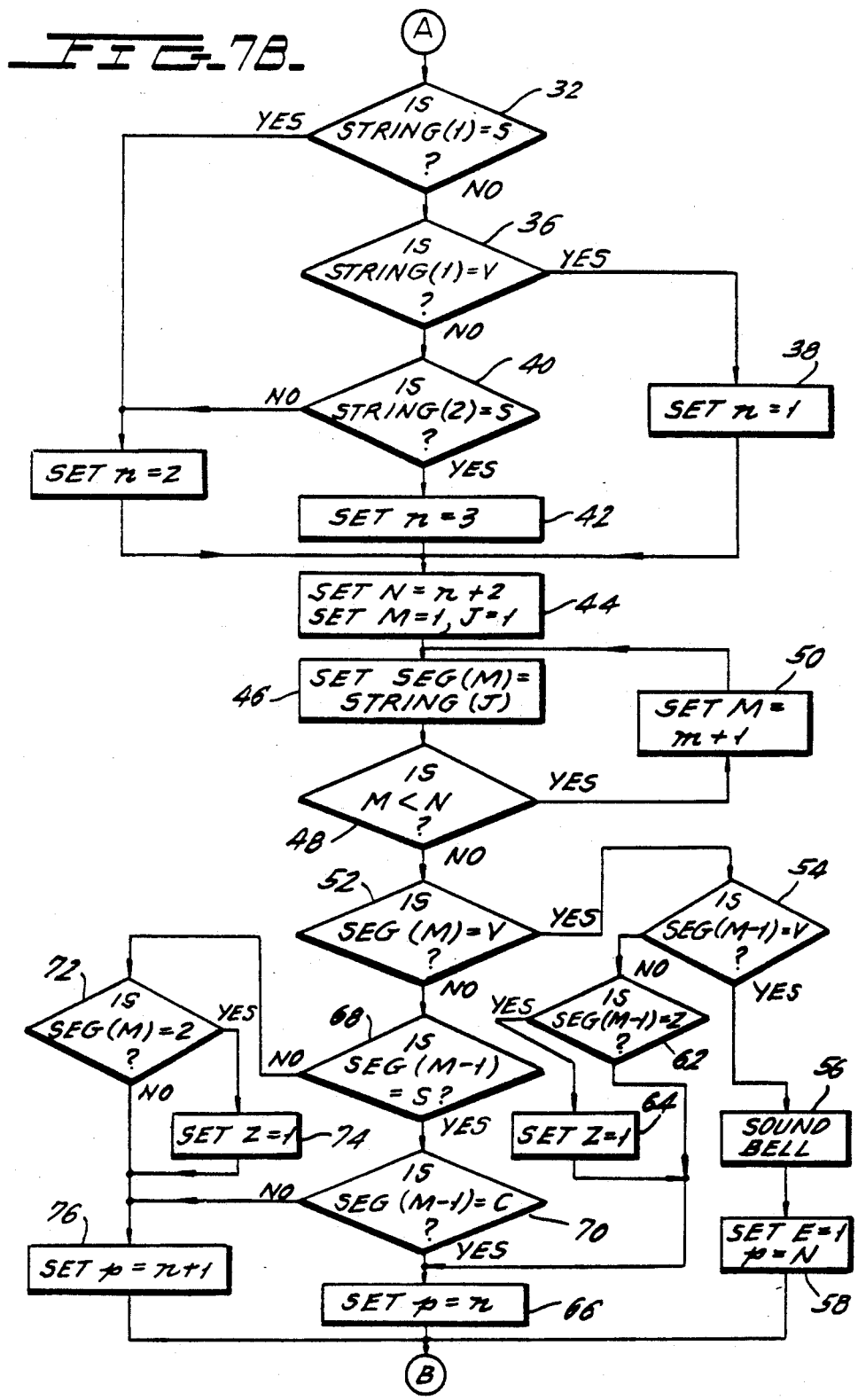

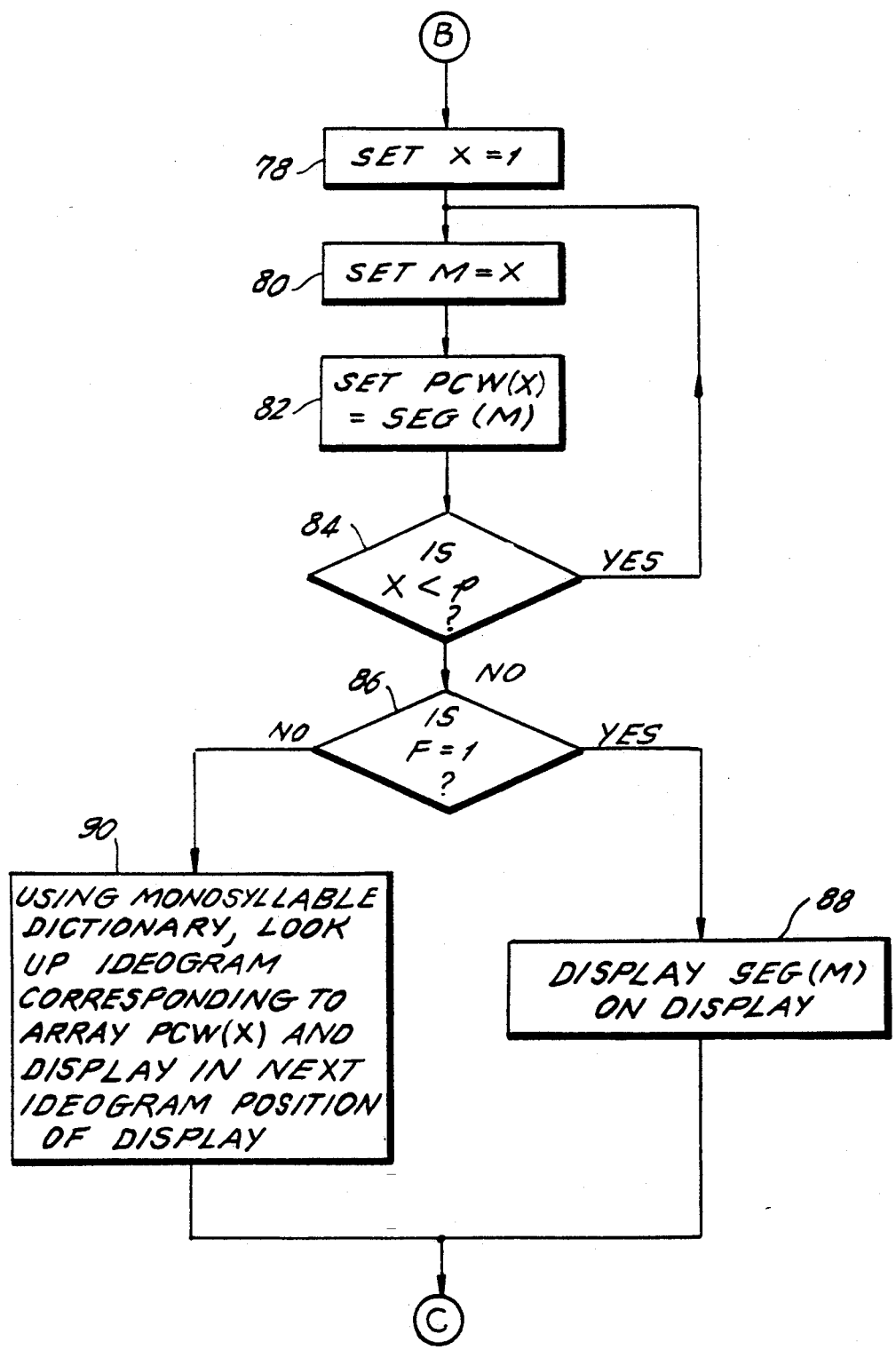

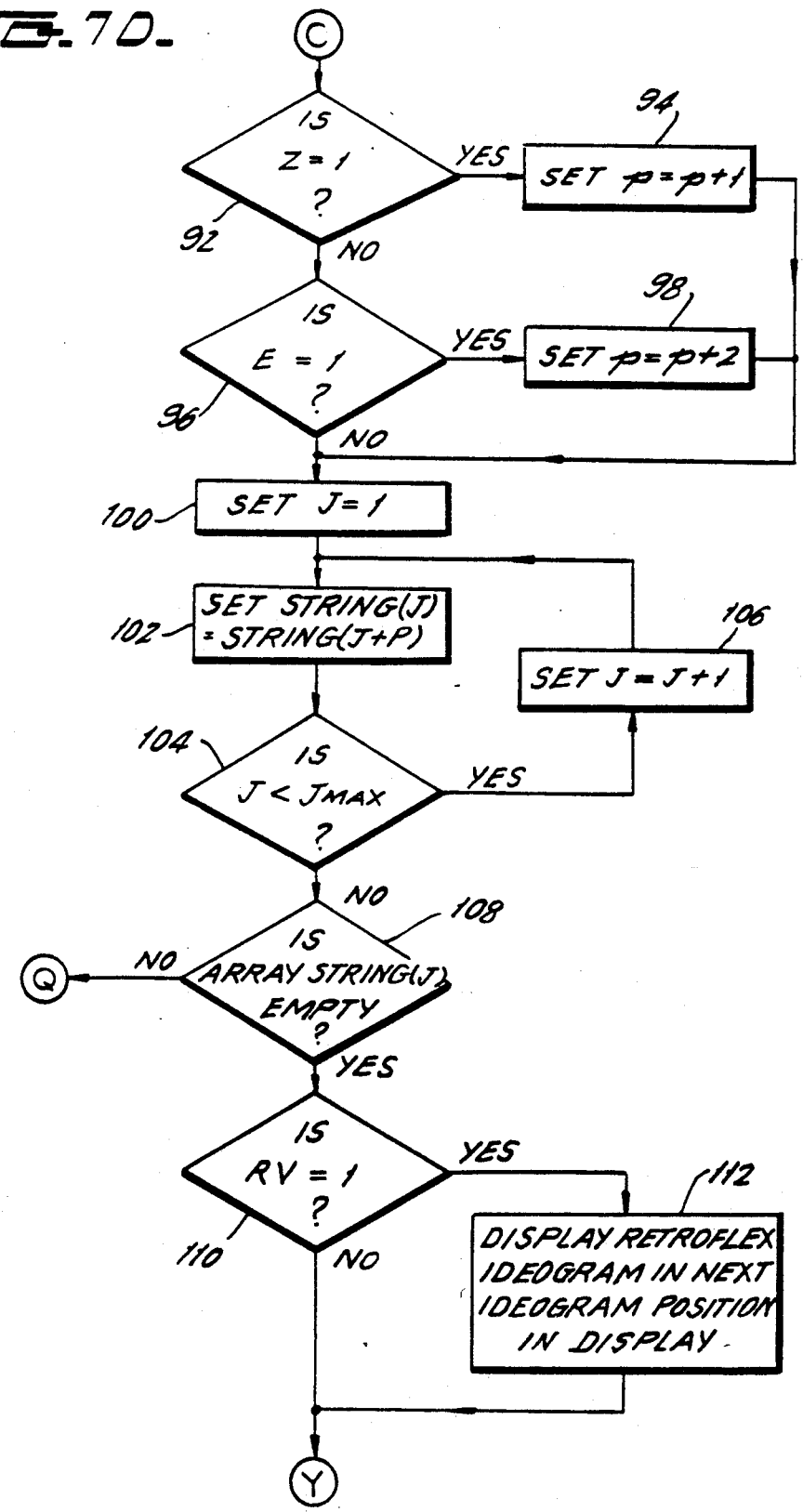

FIG. 8.

DICTIONARY OF PCL, IDEOGRAMS, AND ENGLISH

| PCL | Ideogram | English | PCL | Ideogram | English |
|---|---|---|---|---|---|
| ㄅㄚ | 八 | eight | ㄅㄟ | 杯 | cup, glass |
| ㄅㄚㄅㄞ | 八百 | eight hundred | ㄅㄟㄗ | 杯子 | cup, glass |
| ㄅㄚㄅㄞㄨㄢ | 八百萬 | eight million | ㄅㄟ | 北 | north, northern |
| ㄅㄚㄑ | 八千 | eight thousand | ㄅㄟㄈ | 北方 | northern part |
| ㄅㄚㄕ | 八十 | eighty | ㄅㄟㄐ | 北極 | north pole |
| ㄅㄚㄕㄨㄢ | 八十萬 | eight hundred thou | ㄅㄟㄐㄑㄩ | 北極圈 | arctic circle |
| ㄅㄚㄧ | 八億 | eight hundred mill | ㄅㄨ | 不 | no, negate(b.4th T) |
| ㄅㄚㄨㄢ | 八萬 | eighty thousand | ㄅㄨㄅ | 不必 | not necessary |
| ㄅㄚㄩ | 八月 | August (month) | ㄅㄨㄅㄧㄢ | 不便 | inconvenient |
| ㄅㄚ | 吧 | particle (final) | ㄅㄨㄉ | 不到 | not quite |
| ㄅㄚ | 罷 | particle (final) | ㄅㄨㄉ | 不但 | not only |
| ㄅㄚ | 拔 | pull out | ㄅㄨㄉㄧ | 不定 | uncertain |
| ㄅㄚㄔ | 拔出 | pull out | ㄅㄨㄉㄨ | 不對 | wrong, not so |
| ㄅㄚ | 把 | grip, handle | ㄅㄨㄍ | 不夠 | not enough |
| ㄅㄚ | 爸 | dad, father | ㄅㄨㄍㄨ | 不過 | only, merely |
| ㄅㄚㄅㄚ | 爸爸 | dad, father | ㄅㄨㄏㄨ | 不會 | cannot |
| ㄅㄚ | 罷 | finish | ㄅㄨㄐ | 不見 | not see, not meet |
| ㄅㄚㄇㄧㄢ | 罷免 | dismiss | ㄅㄨㄐㄉ | 不見得 | don't appear to be |
| ㄅㄚㄍㄨ | 罷工 | labor strike | ㄅㄨㄐㄌ | 不見了 | disappeared,missing |
| ㄅㄚㄎㄜ | 罷課 | school strike | ㄅㄨㄕ | 不是 | be not, is not |
| ㄅㄚㄕ | 罷市 | shopkeepers'strike | ㄅㄨㄗ | 不在 | does not lie in |
| ㄅㄚ | 霸 | dictator | ㄅㄨㄘ | 不錯 | not bad (good) |
| ㄅㄚㄨ | 霸王 | feudal chief | ㄅㄨㄧ | 不要 | don't want |
| ㄅㄚ | 逼 | forced to | ㄅㄨㄩ | 不用 | need not |
| ㄅㄧ | 鼻 | nose | ㄅㄨ | 不 | no, negate |
| ㄅㄧㄗ | 鼻子 | nose | ㄅㄨㄈ | 不法 | illegal |
| ㄅㄧ | 筆 | writing instrum't | ㄅㄨㄉ | 不得 | cannot, unable |
| ㄅㄧㄈ | 筆法 | writing technique | ㄅㄨㄉㄅ | 不得不 | cannot help |
| ㄅㄧㄉ | 筆調 | writing style | ㄅㄨㄉㄌ | 不得了 | disastrous |
| ㄅㄧㄓ | 筆者 | writer | ㄅㄨㄉㄧ | 不得已 | could not help |
| ㄅㄧㄧ | 筆友 | pen pal | ㄅㄨㄋ | 不能 | cannot |
| ㄅㄧ | 壁 | wall, cliff | ㄅㄨㄋㄍ | 不能夠 | cannot |
| ㄅㄧㄅ | 壁報 | wall newspaper | ㄅㄨㄎ | 不可 | may not, must not |
| ㄅㄧㄔ | 壁厨 | built-in shelf | ㄅㄨㄎㄧ | 不可以 | may not, must not |

FIG. 9A.

| 彳人虫 | 彳人山 | 彳人土 | 彳人木 |
|---|---|---|---|
| 虫甲 | 山甲 | 土甲 | 木贾 |

FIG. 10.

Phonetic Chinese Alphabet (PCA) Keyboard Arrangement

| 柏 | 杷 | 朴 | 梅 | 樱 | 楓 | 棣 | 棟 | 桃 |
|---|---|---|---|---|---|---|---|---|
| 桐 | 棠 | 楠 | 梨 | 李 | 栗 | 櫟 | 欄 | 栳 |
| 榔 | 槊 | 榴 | 棱 | 棟 | 椋 | 櫸 | 欒 | 格 |
| 桂 | 桄 | 柯 | 栲 | 棟 | 樺 | 槐 | 枷 | 櫃 |
| 楫 | 楷 | 桔 | 椐 | 橘 | 櫸 | 槿 | 樫 | 楸 |
| 椎 | 梣 | 樺 | 橚 | 杏 | 橡 | 枸 | 柞 | 枝 |
| 植 | 枳 | 梽 | 柘 | 樗 | 柱 | 欄 | 槙 | 樟 |
| 檸 | 權 | 樗 | 楮 | 樓 | 橙 | 柿 | 杉 | 榕 |
| 梓 | 棕 | 松 | 檜 | 櫻 | 楊 | 梧 | 榆 | 械 |

FIG. 11

FIG. 13. ENCODING OF PHONETIC CHINESE ALPHABET (PCA) AS CSCII
CSCII -- Chinese Standard Code for Information Interchange [Hex 80-FF]

| PCL# | PCA | DEC | HEX | PCL# | PCA | DEC | HEX | PCL# | PCA | DEC | HEX |
|---|---|---|---|---|---|---|---|---|---|---|---|
| 0 |   | 128 | 80 | 16 | ヒ | 144 | 90 | 32 | ヒ | 160 | A0 |
| 1 | ß | 129 | 81 | 17 | ぅ | 145 | 91 | 33 | E | 161 | A1 |
| 2 | P | 130 | 82 | 18 | B | 146 | 92 | 34 | ヒ | 162 | A2 |
| 3 | ★ | 131 | 83 | 19 | ぅ | 147 | 93 | 35 | ヒ | 163 | A3 |
| 4 | ≢ | 132 | 84 | 20 | ▲ | 148 | 94 | 36 | ⚌ | 164 | A4 |
| 5 | Ⅱ | 133 | 85 | 21 | ぇ | 149 | 95 | 37 | ħ | 165 | A5 |
| 6 | ∂ | 134 | 86 | 22 | ⊤ | 150 | 96 | 38 | ṫ | 166 | A6 |
| 7 | ⋆ | 135 | 87 | 23 | 人 | 151 | 97 | 39 | 5 | 167 | A7 |
| 8 | ♪ | 136 | 88 | 24 | ⋏ | 152 | 98 | 40 | ⋝ | 168 | A8 |
| 9 | I | 137 | 89 | 25 | ⋏ | 153 | 99 | 41 | ⋚ | 169 | A9 |
| 10 | ≚ | 138 | 8A | 26 | ⋆ | 154 | 9A | 42 | ⋚ | 170 | AA |
| 11 | Ħ | 139 | 8B | 27 | Л | 155 | 9B | 43 | ⋆ | 171 | AB |
| 12 | 4 | 140 | 8C | 28 | Λ | 156 | 9C | 44 | ⋆ | 172 | AC |
| 13 | ╋ | 141 | 8D | 29 | 瓦 | 157 | 9D | 45 | ⋆ | 173 | AD |
| 14 | ♭ | 142 | 8E | 30 | ≒ | 158 | 9E | 46 | ⋆ | 174 | AE |
| 15 | ż | 143 | 8F | 31 | L | 159 | 9F | 47 | ⋄ | 175 | AF |
| 48 | ⋚ | 176 | B0 | 64 | ⋛ | 192 | C0 | 80 | ⋎ | 208 | D0 |
| 49 | Ꙁ | 177 | B1 | 65 | ⋛ | 193 | C1 | 81 | ⋕ | 209 | D1 |
| 50 | ⋔ | 178 | B2 | 66 | ⋛ | 194 | C2 | 82 | ⋕ | 210 | D2 |
| 51 | ⋔ | 179 | B3 | 67 | + | 195 | C3 | 83 | Ƴ | 211 | D3 |
| 52 | ⋔ | 180 | B4 | 68 | ± | 196 | C4 | 84 | ⋕ | 212 | D4 |
| 53 | ⋔ | 181 | B5 | 69 | ∓ | 197 | C5 | 85 | ⋕ | 213 | D5 |
| 54 | ⋔ | 182 | B6 | 70 | ∓ | 198 | C6 | 86 | , | 214 | D6 |
| 55 | ⋔ | 183 | B7 | 71 | ⋕ | 199 | C7 | 87 | . | 215 | D7 |
| 56 | ⋕ | 184 | B8 | 72 | ⋕ | 200 | C8 | 88 | \ | 216 | D8 |
| 57 | ⋔ | 185 | B9 | 73 | ⋕ | 201 | C9 | 89 | - | 217 | D9 |
| 58 | ⋔ | 186 | BA | 74 | ⋕ | 202 | CA | 90 | ? | 218 | DA |
| 59 | X | 187 | BB | 75 | ⊢ | 203 | CB | 91 | < | 219 | DB |
| 60 | X | 188 | BC | 76 | ⊥ | 204 | CC | 92 | > | 220 | DC |
| 61 | X̄ | 189 | BD | 77 | T | 205 | CD | 93 | ⋅ | 221 | DD |
| 62 | ⋆ | 190 | BE | 78 | ⊤ | 206 | CE | 94 | ⋆ | 222 | DE |
| 63 | ⋎ | 191 | BF | 79 | ⋓ | 207 | CF | 95 |   | 223 | DF |

METHOD AND APPARATUS FOR DATA PROCESSING AND WORD PROCESSING IN CHINESE USING A PHONETIC CHINESE LANGUAGE

CROSS-REFERENCE TO RELATED APPLICATION

This is a continuation-in-part of U.S. patent application Ser. No. 745,302, filed Jun. 14, 1985.

BACKGROUND OF THE INVENTION

The present invention is directed toward a method and apparatus for data processing and word processing in the Chinese language, and more particularly by the use of a defined Phonetic Chinese Language, which avoids ambiguities resulting from homonyms and homotones.

Modern Chinese is primarily polysyllabic. Traditionally, each written Chinese word is made up of one or more ideograms, which are pictorial representations of a concept or thing. Each ideogram has a monosyllabic pronunciation. The use of monosyllabic words is insufficient, however, in the spoken language, since Chinese includes a large number of homonyms, i.e., words (ideograms in this case) that are written differently or have different meanings, but have the same sound. That is, a single Chinese spoken syllable can represent a large number of different ideograms and therefore a large number of different meanings. This makes it impractical to use monosyllabic words for oral communications.

To overcome this problem, an oral language has evolved which is primarily polysyllabic, wherein a plurality of ideograms are strung together to form a single polysyllabic word, which significantly narrows down the possible meanings of such word. As a result of the foregoing, oral Chinese is approximately 80% polysyllabic (75% bisyllabic). Modern written Chinese has followed the oral language with the result that in written Chinese, many ideogram compounds are used, which are polysyllabic.

Approximately 8,000 ideograms are used in the modern Chinese language While the total number of ideograms is somewhat greater than 50,000, most are rarely used and do not occur in the everyday language. In 1981, the People's Republic of China set up a standard set of 6,763 ideograms which are to be used for telecommunications systems in China. As a result, a base of about 8,000 ideograms will handle most practical applications of Chinese language.

The use of ideograms enjoys a strong cultural bias in China and serves as a unifying force within the nation. For this reason, it is necessary that any word processing or data processing system be capable of generating Chinese ideograms as an output. The use of ideograms as a direct input medium is, however, impractical because of the large number of ideograms (about 8,000) that would be required on a keyboard. Also, since ideograms are not alphabetical, the task of processing and ordering ideograms is difficult and cumbersome. While it is important for data and word processing systems to output ideograms, and while such an output is sufficient for word processing purposes, it is insufficient for data processing purposes. Since ideograms cannot be alphabetized, it is impossible to place the ideogram output of any data processing system into alphabetical form. This hinders the creation of efficient dictionaries, telephone directories, personnel directories and other sorted or alphabetical listings. Thus, there is a need for a non-ideographic representation of Chinese that can be sorted, listed alphabetically, and so forth.

In an effort to overcome the foregoing problems, the Chinese government has developed an alphabetic representation of the Chinese ideographic language. This language, known as Hanyu Pinyin, is representative of the pronunciation of Mandarin (Peking Dialect). The Peking Dialect has about 400 distinct monosyllabic sounds. Pinyin relies on 25 letters of the English alphabet (v is not used) to phonetically represent all 406 of these sounds. Pinyin is successful in achieving this result on a purely phonetic basis. There are 21 consonant sounds and 16 vowel sounds (the sounds "i", "u" and "ü" may be added to the other vowel sounds to achieve an additional 18 compound vowel sounds) in the Chinese language. Each of these sounds can be uniquely represented by a combination of one or more Pinyin letters. Thus, systems employing Pinyin for both input and output have led to improvements in word processing efficiency and convenience.

However, for generating ideogram output, a primary drawback of this system stems from the need to differentiate the large number of homonyms in the Chinese ideographic language. Assuming a base dictionary of some 8,000 ideograms, every Chinese syllable (corresponding to a single ideogram) has an average of 20 homonyms (since there are about 400 distinct syllables in Chinese) with the result that on the average, one Pinyin syllable indentifies 20 different ideograms. In some cases, the number of homonyms for a given sound exceeds 150.

Since the Chinese language is about 80 percent polysyllabic, and since only a limited number of combinations of ideograms are employed to form polysyllabic words, this problem can partially be overcome in computer applications by storing a polysyllabic Pinyin dictionary in computer memory. When a polysyllabic Pinyin word is entered, a limited number of possible corresponding combinations of ideograms are identified, and often a single combination of ideograms can be uniquely identified by the polysyllabic word. However, the use of a polysyllabic dictionary requires a substantially larger storage capacity than if a purely monosyllabic (ideogram) dictionary were utilized and also significantly increases the processing time of converting from the Pinyin input to the ideograph output. Even with the storage of a large polysyllabic dictionary, the predominance of homonyms in Chinese (approximately 40% of bisyllabic words have homonyms) prevents unique and unambiguous mapping between Pinyin and ideograms.

Since many ideographic words have the same pronunciation, and hence are mapped into a given phonetic Pinyin word, written Pinyin also has a large number of homonyms. Systems utilizing Pinyin as an input language generally require special forms of spelling, or require that a character be added at the end of a bisyllabic word to distinguish between homonyms. Other phonetic conversion systems require the operator to make manual selections from among a choice of displayed homonyms of individual ideograms or compound words.

Pinyin has additional major drawbacks, since it disregards the most fundamental characteristic of the Chinese language - the tone pinyin specifies only distinct vowel or consonant sounds, i.e., phonemes Every Chinese syllable also has a tone, i.e., an inflection or pitch pattern. The tone can have any one of the four pitch patterns illustrated in FIG. 1. As shown therein, the four tones are the first tone (1) which starts high and stays high, the second tone (2) which starts at an intermediate level and rises high, the third tone (3) which starts at a medium level, dips low and then rises high, and the fourth tone (4) which starts high and dips low.

The combination of a sound syllable and the tone associated therewith will be referred to hereafter as a tone-syllable. Every ideogram of the Chinese language, and therefore every syllable of the Chinese language, is pronounced as a tone-syllable.

Therefore, a tone-based system would have major advantages Providing sound information alone is not sufficient, because it does not provide the complete information required to properly pronounce an ideogram. Further, as explained above, a sound-based system must deal with the full set of homonyms for a given Chinese sound syllable, and can do so only unsatisfactorily, while a tone-based system need deal only with homotones (syllables which have the same tone as well as the same sound). By resolving at the homotone level, rather than the homonym level, the average number of ambiguities caused by more than one ideogram being represented by a given tone-syllable is reduced significantly. The reduction is about three-fold (only about three-fourths of the possible tone-syllables are used by the Chinese language).

Recognizing the problem of homonyms, some prior art publications have suggested that a meaning-indicating letter be added to each Pinyin syllable to identify the specific ideogram desired Since there are 25 characters in the Pinyin alphabet, 26 different ideograms can be identified by adding one of the 25 characters (or by not adding any character) to the end of a given syllable. This system has not come into significant use, since in the proposed systems the added letters have had no rational connection to the particular ideogram to be represented, and it is difficult, if not impossible, to remember which specific letter corresponds to each specific ideogram.

The deficiencies of a sound-based language were recognized in 1928 by Y. R. Chao, who proposed a phonetic system using the Roman alphabet. This system used a tone-indicating letter which was inserted in each sound syllable to indicate the tone of the syllable. The primary problem with this system is that the extraneous tone-indicating letter prevents the establishment of a meaningful alphabetical listing of the resulting words. It is also much more difficult to read, and does not permit a unique identification between its phonetic words and individual ideograms.

Summarizing the foregoing, Pinyin is deficient in two major respects: (1) it does not take tone into consideration, and (2) it cannot distinguish between homonyms. While modifying Pinyin or other prior art systems to include tone and meaning-indicating letters would alleviate these problems to some degree, this would create problems of its own since it would destroy the alphabetical nature of the language and make it very difficult to create a proper dictionary or other sorted listing. Yet another problem with the modifications to Chinese proposed by the prior art is that the number of letters required to identify a paraticular ideogram would be significantly increased, thereby reducing the readability of the language and making it very difficult to learn.

In any practical alphabetical system, each Chinese word (consisting of one or more ideograms) must be typed as a single string of letters. Words are separated by spaces. In the prior art systems, there is no method for dividing single polysyllabic words into their individual components, with the result that a polysyllabic dictionary must be stored, thereby increasing the memory requirements and processing time of the data processing or word processing system. Even if means were provided for separating the polysyllabic words into their individual component syllables, the prior art alphabetical systems do not achieve a one-to-one correspondence between the phonetic representations of ideograms and the respective individual Chinese ideograms themselves. Thus, the alphabetical representation will often identify a plurality of ideograms which must further be distinguished manually by the operator of the system.

BRIEF DESCRIPTION OF THE PRESENT INVENTION

The present invention utilizes a Phonetic Chinese Language (PCL) which uses a Phonetic Chinese Alphabet (PCA) to form Phonetic Chinese Words (PCWs), each of which corresponds to a single ideogram. The Phonetic Chinese Words are, in turn, strung together to form Polysyllabic Phonetic Chinese Words (PPCWs). Each PPCW corresponds to a single Chinese polysyllabic compound word consisting of a plurality of ideograms. The Phonetic Chinese Language of the present invention has the following unique characteristics:

1. It utilizes a truly tone-based alphabet in which a discrete set of letters provides all of the phonetic and tonal information to pronounce all syllables of the Chinese language (Mandarin);

2. It utilizes either a dominant-root principle or a semantic classifier principle to select an additional character to be added to some PCWs to provide a unique one-to-one correspondence between PCWs and Chinese ideograms, such that each PCW uniquely and unambiguously identifies a single ideogram; and 3. It enables the use of separation logic to automatically divide a Polysyllabic Phonetic Chinese Word (PPCW) comprising an unbroken string of PCL characters which together represent a polysyllabic compound word (a Chinese word consisting of a plurality of ideograms), into individual PCWs (which correspond to ideograms).

In PCL a given sound syllable can be written in four different ways to indicate the four different tones of the sound syllable. As a result of the tonal nature of the alphabet, the language is highly readable and automatically provides three times greater resolution than a purely sound-based system. A data processor or word processor receiving a PCL input need deal with a average of only 6 homotones rather than some 20 homonyms as in the prior art (assuming a set of about 8,000 ideograms).

Since the tone-based alphabet provides three times the degree of resolution of a sound-based alphabet, and due to special characteristics of the PCA described below, it is possible to achieve one-to-one correspondence between PCWs and Chinese ideograms, even in those cases where a large number of homonyms exists. As will be shown in greater detail below, the PCL of the present invention can distinguish between 255 homotones (an equivalent of 1,020 (255×4) homonyms) for tone-syllables wherein the only vowel is the Pinyin sound "i", "u" or "ü"; can distinguish between 170 homotones (equivalent of 680 homonyms) for tone-syllables ending in the Pinyin sound "i"; and can disonyms)

for all other tone-syllables This one-to-one correspondence between PCWs (which contain all of the sound and tone information required to pronounce a given tone-syllable) and ideograms is not possible with prior art systems.

A major advantage of the present invention is the ability to write a Polysyllabic Phonetic Chinese Word as an unbroken string of letters from the Phonetic Chinese Alphabet in a manner which permits a computer program to separate the PPCW string into individual PCWs without a pre-stored polysyllabic dictionary This aspect of the invention is extremely important. As a result of this feature, in combination with the one-to-one correspondence between PCWs and ideograms, it is not necessary to store a polysyllabic dictionary in computer memory. Rather, all PPCWs may be entered as continuous chains of PCL letters, which are then subjected to a separation method which divides the PPCW into individual PCWs. The computer then refers to a monosyllabic dictionary to convert each PCW to its corresponding ideogram. This significantly cuts down the storage requirements and processing time of any data processing or word processing system utilizing the present invention.

Another significant result of the use of the separation logic and unique one-to-one correspondence between PCWs and ideograms is that a data processor can automatically produce an alphagrammic listing (AGL) from stored PPCWs in a manner that is not possible with prior art systems. An alphagrammic listing is one which lists PCWs in generally alphabetical order, but ensures that homotones and identical ideograms are grouped together even when the alphabetical order indicates they should be separated. A purely alphabetical PCL listing might result in words or phrases which have the same initial ideogram being separated from each other due to the presence of a semantic classifier in some words and its absence in others An alphagrammic listing avoids this possibility, and groups all words having the same initial ideogram together. The AGL is described in greater detail below.

As a result of the tone-based nature of the PCL, and further as a result of the dominant-root and semantic classifier distinctions described below, the PCL can uniquely identify all 50,000+ ideograms. Of the 8,000 ideograms in the primary set, about 3,900 can be uniquely identified by using only three variations on the spelling of each PCW "root" following a defined "dominant-root" principle. These account for about 97 percent of language usage in Chinese. Of the remaining ideograms in the primary set, 80 percent can be identified by using a semantic classifier which is similar or identical to the Chinese radical on which the ideogram is based. Thus, the PCL is both concise and has high readability. All other ideograms in the Chinese language can also be uniquely identified, by using a single semantic classifier. Thus, the PCL can uniquely identify all Chinese ideograms.

Thus, the PCL uses a maximum of 4 letters and a frequency-weighted average of only 2.4 letters per ideogram, compared to a maximum of 7 (possibly 8) and an estimated frequency-weighted average of 4 letters which would be required using Pinyin. By selecting letters for the Phonetic Chinese Alphabet whose form is similar to a Chinese ideogram or a portion thereof, the PCA letters (even when used as semantic classifiers) can be easily understood by individuals familiar with Chinese ideograms. This technique is used to its greatest advantage when the semantic classifiers are directly identified with the radicals of ideograms, which are basic ideogram forms from traditional Chinese.

Also, when the PCL is juxtaposed with the corresponding ideograms on a video display or printout, either side-by-side or in alternating lines of text, each ideogram can easily be read in conjunction with the corresponding PCW. This presents the ideogram together with its pronunciation in a compact form, and makes the PCL an ideal tool for teaching the ideographic Chinese language.

The PCL also simplifies the hardware and software required for computer handling of the Chinese language. The above-mentioned Chinese standard, designated the "Code of Chinese Graphic Character Set for Information Interchange - Primary Set" uses a two-byte digital code for each Chinese ideogram. A similar but much larger set of 13,053 ideograms, the "Standard Code for Universal Chinese Ideographic Characters," was released by the Republic of China (Taiwan) in March 1986, and also uses a two-byte code for each ideogram.

In the phonetic Chinese language described herein, only a 7-bit code is needed to encode the entire 85-letter phonetic Chinese alphabet. This 7-bit code, which will be referred to herein as the Chinese Standard Code for Information Exchange (CSCII), is illustrated in FIG. 13. It is similar to the ASCII (American Standard Code for Information Exchange), in that both employ 7 significant bits. However, while the ASCII occupies the range $0_{10}$–$127_{10}$ (00H–7FH), as shown in FIG. 13, the present form of the CSCII, including punctuation marks, occupies the range $129_{10}$–$222_{10}$ (81H-DEH). Thus, the CSCII is similar to the ASCII, with the addition of a leading "1" bit. It is therefore very convenient for use in English/Chinese bilingual information exchange, in that it employs both a visual alphabet display and a digital coding system which are easily adaptable for computers.

The PCL thus avoids any need for graphical coding of ideograms. Rather, each ideogram is represented by tonally spelling the ideogram as a PCW, which is coded as a unique combination of 7-bit PCA letter codes. Thus, each ideogram is coded as a combination of no more than 4- and a frequency-weighted average of 2.4 - standardized 7-bit PCA letter codes, which leads to a significant simplification of the hardware and software requirements for computerized Chinese text processing.

As a result of the foregoing features, the present invention provides complete freedom to wordprocess and information-process data in PCL form using the same techniques used in English language processing, while at the same time making it possible to unambiguously output Chinese ideograms and create alphagrammic listings.

BRIEF DESCRIPTION OF THE DRAWINGS

For the purpose of illustrating the invention, there is shown in the drawings an embodiment which is presently preferred, it being understood, however, that the invention is not limited to the precise arrangements and instrumentalities shown.

FIG. 2 is a table showing the letters of the Phonetic Chinese Alphabet (PCA) and how they correspond to the sound domain of the Pinyin alphabet.

FIGS. 3A-C is a sound table illustrating the Pinyin representation of all of the sound syllables of the Chinese language.

FIGS. 4A-4J are tone tables showing the Phonetic Chinese Language representation of all of the tone-syllables of the Chinese language.

FIGS. 5A, 5B and 5C are tables illustrating the manner in which the sound syllables "i", "u" and "ü", respectively, can each be written in twelve different ways using the Phonetic Chinese Alphabet.

FIGS. 7A-7D are flow diagrams illustrating the separation logic of the present invention.

FIG. 8 is a sample of an alphagrammic listing which can be produced by the present invention.

FIGS. 9A-9B are charts illustrating how the semantic classifiers of the present invention can be used to distinguish between homotones.

FIG. 10 is a schematic diagram of a keyboard layout in accordance with the present invention.

FIG. 11 is a chart which presents an example of how the Phonetic Chinese Language resolves homotones.

FIG. 13 illustrates a 7-bit code for representing the PCA in digital form.

DETAILED DESCRIPTION OF AN EMBODIMENT OF THE INVENTION

A. Phonetic Chinese Language

Figures 1, 6:
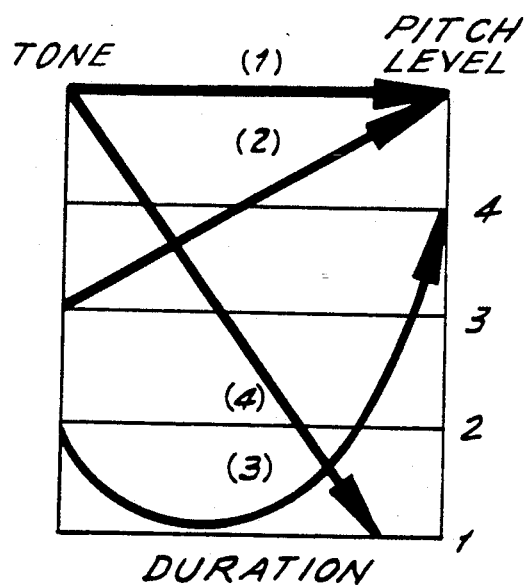
FIG. 1 is a graph showing the four tones of the Chinese language.
FIG. 6 is a table illustrating the possible forms that a Phonetic Chinese Word can take in accordance with the Phonetic Chinese Language of the present invention.
Figure 7A:
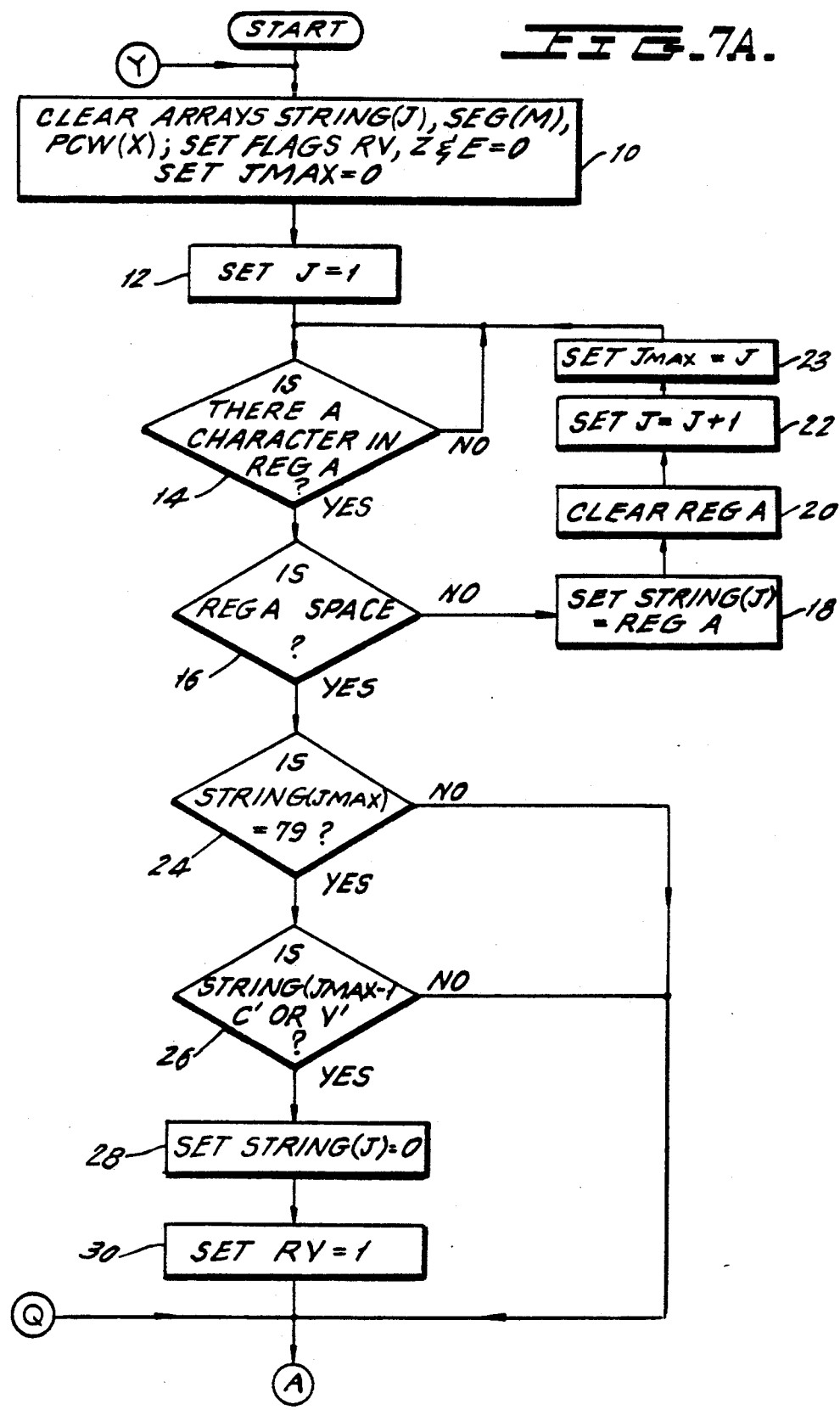

The present invention is based on a tone-based alphabet which is illustrated by way of example in FIG. 2. While this alphabet represents the inventor's presently preferred embodiment, other letter representations which carry the same or essentially the same tone and sound information can be used. Whatever specific letter representations are used, it is highly preferable that distinct, but related, letters be used to represent vowels having the same sound but different tones.

Also, as shown in FIG. 13, the PCA can be encoded as a set of digital codes having only 7 significant bits, which substantially simplifies hardware and software requirements over prior art systems.

As shown in FIG. 2, applicant's Phonetic Chinese Alphabet includes 25 consonants and 60 vowel-tones (a voweltone is a letter indicating both a vowel sound and the specific tone with which the vowel is pronounced) for a total of 85 letters Each letter is assigned a sequential number which can readily be used for data processing purposes. In the chart of FIG. 2, the Pinyin sound equivalent to the PCA letter, if such equivalent exists, is indicated below the PCA letter Pinyin does not always distinguish between characters with the sounds "u" and "ü" by including the umlaut, and this can lead to confusion as to how the character is to be pronounced. However, this distinction is made clearly in the PCL to increase its readability. Since Pinyin letters do not include tone information, the Pinyin equivalents to the PCA voweltones are set forth only below the voweltones that are pronounced with the first tone (see FIG. 1). The same sound, but different tone, is utilized for each of the related voweltones in the columns of FIG. 2. Thus, each of the voweltones 23-26 have the sound "a". Hereinafter, the letters of the Phonetic Chinese Alphabet will be referred to interchangeably by their pinyin equivalents, their assigned numbers, or by the actual PCA letters themselves.

The Chinese language includes 21 consonant sounds and 15 vowel sounds. The 21 consonant sounds are listed in two rows corresponding to the short consonant sounds and long consonant sounds, respectively. Each long consonant sound inherently has one of various basic vowel sounds built into it. Some Chinese ideograms correspond to a long consonant sound; these must have a tone-indicating character included in the corresponding PCW. This is achieved by adding one of the voweltones 27-30 or 79-82, which in this situation only add tone, but do not contribute a vowel sound. The short consonants, on the other hand, do not include a vowel sound and must be followed in a PCW by a vowel-tone indicating both the vowel sound and the tone to be employed.

In addition to the 21 traditional consonants 1-21, the PCA further includes a zero consonant 22 and semi-consonants 83-85. The zero consonant 22 (indicated by the symbol O) is silent, and is used as a syllable delimiter to separate individual syllables of polysyllabic words in certain specified situations described below. It is also used to distinguish between homotones using the dominant-root principle discussed below.

The semi-consonants 83, 84 and 85 are pronounced with a vowel sound but act like consonants since they do not incorporate any tone. Rather, a tone must be added to them in a PCW. The sounds of the semi-consonants 83, 84 and 85 are identical to the sounds of the voweltones 27-30, 39-42, and 47-50, respectively, so each of the latter voweltones may be added to its respective semi-consonant to contribute a tone thereto. This adds significant flexibility to the PCL, enabling resolution between a higher number of homotones. More importantly, the combination of one of 83, 84 or 85 with another vowel forms the 18 Pinyin compound vowels. The inclusion of two separate sets of "i", "u" and "ü" (83-85 versus 27-30, 39-42 and 47-50) provides an important foundation from which the separation logic is eventually made possible.

The Chinese language includes 15 vowel sounds, each of which can carry any one of the four tones illustrated in FIG. 1, with the result that there are 60 distinct voweltones in the Chinese language. In the PCL, each of the vowels is broken up into a family of four related voweltones, each having the same sound but a different tone.

By way of example, the voweltones 23-26 all have the same sound "a" but carry the first through fourth tones (corresponding to the tones 1-4 of FIG. 1) as indicated. Each letter of a voweltone family has the same base character but is distinguished with the use of an additional line added somewhere within the base character to identify the second, third and fourth tones. With particular reference to the family of voweltones 23-26, for example, a line is added to the bottom of the base character to identify the second tone; a line is added to the top of the base character to identify the third tone; and a line is added about one-quarter of the way down from the top of the base character to identify the fourth tone. Similar distinctions are made for each of the families of voweltones as shown.

The voweltones 27-30 serve two purposes. When they follow the short consonants, they are pronounced "i" and include both sound and tone information. When they follow the long consonants, or the semi-consonant 83, they act as silent vowels and carry tone only. In FIG. 2 this is indicated by a dash. In the latter case, a default vowel sound is inherently contained in the long consonant or semi-consonant itself.

The voweltones 35-38 also serve a dual purpose. When they follow the short consonants 1-4 or the semi-consonants 83-85, they are pronounced "o". When they follow the remaining letters, they are pronounced "e". This dual use is made possible by the fact that there are no tone-syllables in the Chinese language where the sound "e" follows the sounds "b", "p", "m", "f", "y", "w" and "Yu" and there are no tone-syllables in the Chinese language wherein the sound "o" follows the remaining consonant sounds. This efficient use of the voweltones 35-38 reduces by four the total number of letters required in the PCA.

The voweltones 79-82 serve three purposes. Whenever these voweltones are written alone or following the zero consonant 22, they are pronounced "er". Whenever they follow a short consonant, they are pronounced "i". Whenever they follow a long consonant or any of the semi-consonants, they have no sound and provide tone information only (the vowel sound being provided by the long consonant or semi-consonant itself).

Each ideogram of the Chinese language is defined by a single tone-syllable which can take any one of the following forms: CV, CSV, SV and V, wherein C is a consonant, S is a semi-consonant (a letter having a vowel sound but carrying no tone) and V is a voweltone (a letter having a vowel sound and a tone). Utilizing the letters illustrated in FIG. 2, the Phonetic Chinese Alphabet can provide all of the sound and tone information required to pronounce every tone-syllable (and therefore every ideogram) of the Chinese language The manner in which these letters may be combined to produce the required information is illustrated in detail in FIGS. 4A-4J, which is a tone table showing the PCL representation of all the tone-syllables that occur in the Chinese language In this table, the consonants of the PCA are listed vertically and the voweltones horizontally. The Pinyin sound equivalent of each PCA letter, as well as the number assigned to the PCA letter, is indicated adjacent the PCA letter.

FIGS. 4A-4D illustrate all of the tone-syllables taking the form CV, SV and V. FIGS. 4E-4J illustrate all of the tone-syllables taking the form CSV. A heavy horizontal line is drawn between consonants 11 and 12 to separate the short consonants from the long consonants, since the voweltones 27-30 and 79-82 are pronounced differently depending on whether they follow a short or long consonant (see above). Similarly, in FIG. 4A heavy lines are drawn between the consonants 4 and 5 and between the zero consonant and the semi-consonant 83 under the column for voweltones 35-38, to indicate that the different sounds assigned to the voweltones 35-38 depend on which consonant they follow.

The PCA is capable of representing about 3,000 tone-syllables. Many tone-syllables can be written in more than one way using the PCA. This is shown in FIGS. 4A-4J and is described further below. The Chinese language incorporates only 1,292 of these tone-syllables. The tone-syllables which are not used in the Chinese language are indicated in FIGS. 4A-4J by the presence of a blank space or a dash.

While the PCA can represent all 1,292 tone-syllables of the Chinese language, standard Pinyin can only represent the 410 sound syllables of the Chinese language. The full sound table of Pinyin is shown in FIG. 3. The increased resolution of the Phonetic Chinese Language compared to Pinyin will be readily apparent by comparing the tone and sound tables of FIGS. 3 and 4A-4J. This additional resolution of the PCL is achieved utilizing fewer letters per syllable than the Pinyin system, thereby increasing the readability of the Phonetic Chinese Language while providing more information than is possible using Pinyin.

Employing the Phonetic Chinese Alphabet, it is possible to phonetically and tonally provide all of the information required to pronounce a tone-syllable taking any of the possible forms CV, CSV, SV and V. However, the sound and tone information required to pronounce an ideogram does not in itself provide sufficient information to distinguish between homotones. For this reason, if necessary, the PCL adds an additional classifying character to the tone-syllable to distinguish between homotones. The particular character added to the tone-syllable is determined either by a dominant-root system or by a semantic classifier system.

The dominant-root system is used to distinguish between the three most commonly occurring homotones (based on actual frequency of usage) for each tone-syllable. In accordance with this system, a Phonetic Chinese Word (identifying a unique ideogram) can be written in a primary form consisting of the tonesyllable (TS) alone (if it is not necessary to distinguish homotones), in a secondary form consisting of the tone syllable with its vowel repeated (TS+V), and in a tertiary form consisting of the tone-syllable followed by the zero consonant (TS+Z). For example, primary, secondary and tertiary forms for writing the tone-syllable "sha" are:  (primary),  (secondary) and  (tertiary). Utilizing this simple system, each tone-syllable has achieved three additional degrees of resolution, and each sound syllable has attained 12 (4×3) additional degrees of resolution. The combined set of tone-syllables written in the primary, secondary or tertiary form is sufficient to represent approximately 97 percent of the Chinese language in terms of frequency of occurrence. Thus, the PCA can be utilized to uniquely identify 97 percent of the ideograms occurring in the Chinese language based on frequency of occurrence following the simple dominant-root rules alone.

Since it is relatively easy for an individual to memorize the three most frequent homotones for each tone-syllable, this provides a very practical input system. Even if the person entering the Phonetic Chinese Words (into a keyboard or other input device) does not remember which homotone is the first, second or third most frequent in terms of occurrence, it is a simple and quick task to merely guess the appropriate PCW form, observe the corresponding ideogram shown on the display screen and change the entry if the displayed ideogram does not correspond to the desired ideogram.

The homotones of the Chinese language which account for the remaining 3 percent of Chinese language usage are distinguished by use of a system of semantic classifiers. Each of the letters of the PCA can be used as a semantic classifier representing a specific category of meaning (e.g. insects, mountains, trees), to provide a logical indication of which homotone is desired. (This is distinct from their use as indicators of sound and tone information.) The one exception is voweltone 79, which is used only to identify a specific ideographic Chinese character called the "retroflex ideogram" as further discussed below. When used as a semantic classifier, a PCA letter is attached at the end of a tone syllable, where it conveys meaning to the reader, but not sound or tone.

By way of example, the letters 72, 84, 68 and 3 are identical or substantially identical to the traditional ideographic radicals for: insects, worms (72); mountains (84); earth, dirt (68) and trees, wood (3), respectively. These letters are used as semantic classifiers having these meanings. In the top row of Fig. 9A, these letters are added to the tone-syllable " 亻" to form four different PCWs. The associate Chinese ideograms (which incorporate substantially the same radicals) are shown below the PCWs.

FIG. 9B is another illustration of how semantic classifiers can be used to distinguish between homotones. This figure is a dictionary listing of PCWs in alphagrammic order from left to right, along with their corresponding ideograms. Each ideogram incorporates the radical for "wood", and each PCW has character (3), which is similar thereto, at its end. Note further that the four entries in the dashed block marked 9b are homotones which in Pinyin would not be distinguishable.

Utilizing a combination of the dominant-root system and the semantic classifier system, each tonesyllable can distinguish between 85 homotones (equivalent to 340 homonyms). While this is more than sufficient for most tone-syllables, some tone-syllables have more than 85 homotones. These tone-syllables fall into two classes: (1) those tone-syllables wherein the only vowel is "i", "u" or "ü", and (2) those tone-syllables ending with the vowel "i". By utilizing the unique characteristics of the Phonetic Chinese Alphabet, the Phonetic Chinese Language is capable of resolving 170 homotones (equivalent of 680 homonyms) for all tone-syllables ending in the vowel "i" and 255 homotones (equivalent of 1,020 homonyms) for those tone-syllables wherein the only vowel sound is "i", "u" or "ü". This is achieved in the following manner.

As shown in FIG. 2, the sound "i" can be written utilizing either the semi-consonant 83 or the voweltones 27-30. Similarly, the sound "u" can be written utilizing the semi-consonant 84 or the vowel-tones 39-42. Finally, the sound "ü" can be written utilizing the semi-consonant 85 or the voweltones 47-50. While the semi-consonants 83-85 do not include a tone, the above-mentioned voweltones can be used to indicate tone when they follow the semi-consonant having the same sound information. Also, the voweltones 79-82, as mentioned above, can be used to indicate tone when they follow the semi-consonants 83-85.

Figures 5A, 5B, 5C:
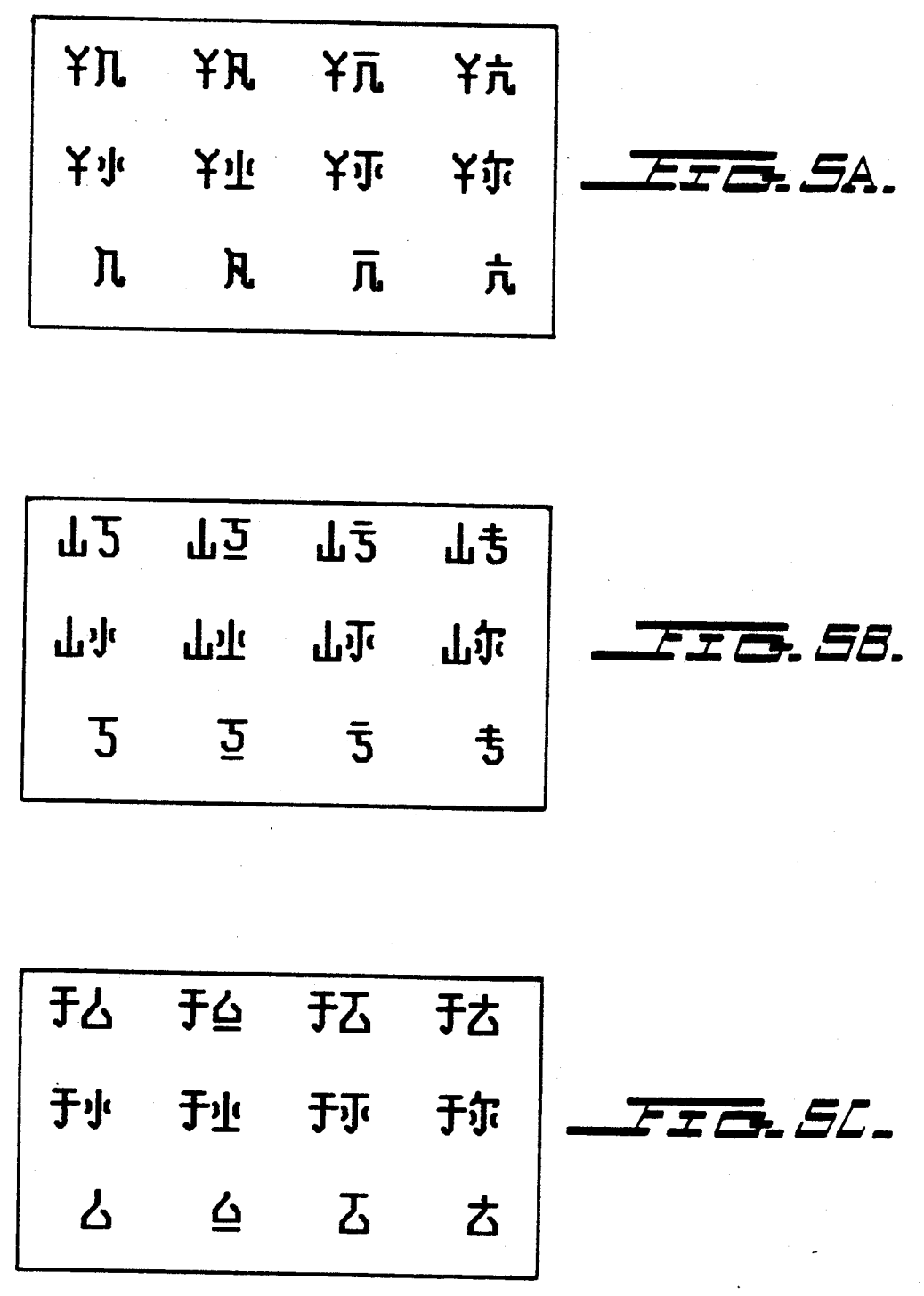

This makes it possible to write each of the tone-syllables "i", "u" and "ü" in twelve different ways as shown in FIGS. 5A-5C. In the first row of each of these Figures, the semi-consonant is used to provide sound information and the voweltone containing the same sound is used to provide tone information. In the second row of FIG. 5, the semi-consonant is used to provide sound information while the silent vowels 79-82 are used to provide tone information. In the third row of FIG. 5, the voweltone is used alone to provide both sound and tone information. This unique ability of the PCA increases the flexibility and the resolution power of the PCL to a substantial degree compared to prior art systems.

The resolution of the PCL for tone-syllables ending in the sound "i" is also significantly greater than the resolution of prior art systems. This results from the fact that the voweltones 27-30 and 79-82 can all be pronounced "i" depending upon the particular consonants they follow. When the voweltones 79-82 follow a short consonant, they are pronounced "i". In fact, there are no tone-syllables in the Chinese language in which the sound "i" follows the consonants "f", "g", "k", "h" or "r". Thus, the voweltones 79-82 are never used following the consonants 4, 9, 10, 11 or 18, so these combinations are available for distinguishing homotones. Whenever the voweltones 79-82 follow a long consonant 12-21 or a semi-consonant 83-85 (each of which has a vowel sound built into it by default), they act as silent vowels which carry no sound but indicate the tone of the tone-syllable. The vowel-tones 27-30 are also pronounced "i" whenever they follow a short consonant. Whenever they follow a long consonant, they act as silent vowels which carry no vowel sound but indicate the tone of the tone-syllable. As a result of the foregoing characteristics of the voweltones 27-30 and 79-82, the Phonetic Chinese Language has the capability of writing 170 homotones ending in the sound "i": 85 wherein the base tone-syllable ends with one of the voweltones 27-30, and an additional 85 wherein the base tone-syllable ends with the voweltones 79-82, with the result that the PCL can uniquely distinguish between 680 homonyms ending with this sound.

Figure 11:
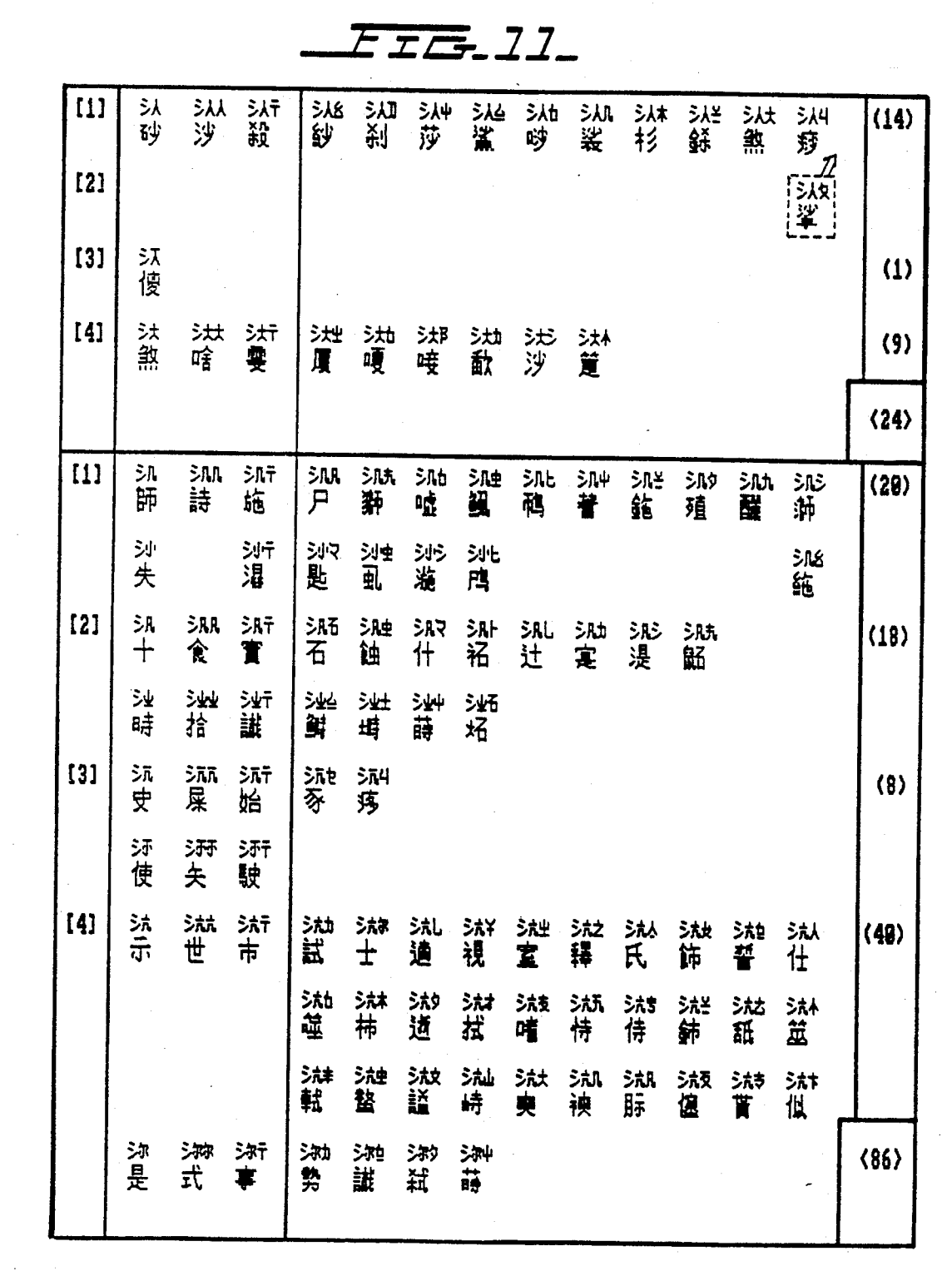

FIG. 11 shows two examples of how the PCL resolves ideograms having a large number of homotones and homonyms, in this case "sha", with 24 homonyms, and "shi", having 86 homonyms.

Each row shows all the homotones of a given tone-syllable. For example, the first row (marked "14" on the right) shows the 14 homotones of the tone-syllable "sha" pronounced with the first tone. Below each PCW is the corresponding ideogram. The first three PCWs are the primary, secondary, and tertiary PCWs according to the dominant-root system. In the remaining 11 PCWs, the third PCL is a semantic classifier.

Referring now to the bottom section of FIG. 11 (marked "40" on the right) there are seen in 40 homotones of the tone-syllable "shi" pronounced with the fourth tone. In the first 33 homotones, the vowel "i" is represented by voweltone 30. In the last seven homotones, the vowel "i" is represented by voweltone 82.

B. Separation Logic

An ideal representation of the Chinese language has three attributes:

1. It provides all the sound and tone information required to phonetically and tonally pronounce Chinese tone-syllables;

2. It provides a simple and efficient method for distinguishing between homotones; and 3. It provides a basis for separating a polysyllabic string into its individual components, each of which corresponds to one ideogram, without resorting to a polysyllabic dictionary.

As described in detail above, the Phonetic Chinese Language of the present invention clearly possesses the first two attributes. As will now be described, it also possesses the third attribute.

All Phonetic Chinese Words formed utilizing the Phonetic Chinese Alphabet take one of the following two forms:

$$PCW = TS - G \qquad \text{Eq. (1)}$$

$$PCW = TS \qquad \text{Eq. (2)}$$

wherein TS is a tone-syllable (taking one of the four forms CV, CSV, SV or V) and G is a single character of the PCA which is added to the tone-syllable to distinguish between homotones. This additional letter is selected using either the dominant-root principle or the semantic classifier principle as described above. This letter, whether selected using the dominant-root or the semantic classifier principle, will be referred to as the generalized semantic classifier G.

Thus, the relationship of Equations (1) and (2) can be expressed more generally as $$PCW = TS + Q \qquad \text{Eq. (3)}$$

wherein Q is a generalized tone-syllable modifier which defined to include both the generalized semantic classifier G and the null set $\phi$ (i.e., the omission of any letter). The generalized tone-syllable modifier Q can therefore represent either the absence of a letter or the presence of any of the letters of the PCA (except the voweltone 79 which, as discussed more fully below, is never used as a semantic classifier).

As described above, the tone-syllable can take any of four forms: CV, CSV, SV and V. The generalized tone-syllable modifier Q may assume any one of the five forms $\phi$, C, Z, V, or S (Z representing the zero consonant 22). Thus, PCWs may assume any one of the twenty distinct forms shown in FIG. 6.

When strung together, the forms of the first two columns (CV, CSV) are totally distinguishable from one another. The third and fourth columns (disregarding the asterisks for the present) can, however, be confused with the first and second columns if the PCWs of the third and fourth columns form part of a PPCW wherein the immediately preceding PCW ends in a consonant. More particularly, if a PCW of the third column follows a PCW taking the form CVC or CSVC, the PCW of the third column can be confused with a PCW of the second column. Similarly, if a PCW of the fourth column follows a PCW taking the form CVC or CSVC, it can be confused with the PCWs of the first column.

To avoid this possibility, the zero consonant 22 is to be added by the writer of PCL text to the beginning of the PCWs of columns 3 and 4 whenever one of these PCWs forms part of a PPCW and the immediately preceding PCW takes the form CVC or CSVC. This is indicated by the presence of an asterisk in front of each PCW in the third and fourth columns. By following this simple entry rule, it is possible to create a simple computer program which can unambiguously divide a PPCW into its individual PCW components and then identify the specific Chinese ideogram corresponding to each separated PCW.

Another special technique is necessitated by the nature of the retroflex ideogram. The retroflex ideogram (also referred to as the retroflex vowel) is the sole Chinese ideogram which modifies the sound of a prior ideogram to make the prior ideogram end in the sound "er". This is the only case where two consecutive ideograms combine to form a single syllable (ending in "er"). As a result, the retroflex ideogram will always appear at the end of a polysyllabic string and therefore at the end of a PPCW. As described above, the voweltone 79 is one of those that are pronounced "er" when they stand alone or follow the zero consonant 22. Since the retroflex ideogram is pronounced "er" in Chinese, the voweltone 79 is defined to represent the retroflex ideogram. This designation is important in enabling the computer program to unambiguously divide a PPCW into its individual PCW components and then identify the specific Chinese ideogram corresponding to each PCW. As will be described below, the program treats the retroflex ideogram differently than the remaining ideograms. The program identifies it by looking for this ideogram before otherwise separating the PPCW into individual PCWs.

A flow chart setting forth a method for separating PCWs is illustrated in FIGS. 7A-7D. This method may be implemented as a computer program, which can be carried out by any general purpose computer. The illustrated flow chart presents the manner in which entered PPCWs are converted to Chinese ideograms utilizing a separation logic and a monosyllabic dictionary which uniquely relates each PCW to a single ideogram. This program can be used in connection with a larger data or word processing program as desired.

While one specific program is being illustrated, the invention is not limited to this program, and a programmer of ordinary skill will be able to design many other programs utilizing the same principles and achieving the same result as in the present embodiment of the invention. In addition, the described program identifies an ideogram and then displays it on an output device. A display of the ideogram is not absolutely necessary and the PCL and separating logic can be used simply to identify an ideogram without displaying it. Broadly, the invention can be considered to include the use of separation logic to separate a polysyllabic string.

Turning now to FIGS. 7A-7D, the program begins at instruction block 10 wherein the arrays STRING (J), SEG(M), and PCW(X) are cleared and the flags RV, Z and E and the variable JMAX are set equal to zero. The array STRING(J) is used to store consecutive letters of a PPCW. The first letter of the PPCW will be stored in element STRING(1), the second letter of the PPCW will be stored in element STRING(2), etc. The array STRING(J) is dimensioned to have a sufficient number of elements to store the largest PPCW which the system is designed to handle. In most cases, a 20 element array is of sufficient size. If desired, the array STRING(J) can be made very large in order that a continuous string of PCA letters (comprising a plurality of PPCWs) can be entered without depressing a space bar to separate PPCWs (compound Chinese words).

The array SEG(M) is a five-element array which will temporarily store a portion of a PPCW string which is examined to determine how many characters of that string define a PCW. The array PCW(X) is used to temporarily store a PCW so that its corresponding ideogram can be identified. When the arrays STRING(J), SEG(M) and PCW(X) are cleared, each of their elements is set to zero.

The flag RV is the retroflex vowel flag and is set equal to "1" whenever the final character of a PPCW represents the retroflex vowel 79. Whenever the flag RV is set to zero, this indicates that the last letter of a PPCW does not represent the retroflex vowel.

The zero consonant flag Z indicates whether the first letter of a PCW is the zero consonant 22. If the first letter is the zero consonant, the flag Z is set equal to "1".

The flag E is the error flag and is set equal to "1" whenever the separation logic determines that a string of PCA letters takes an improper form.

The variable JMAX is incremented with the counter J as a PPCW is loaded into STRING(J), so as to track the length of the PPCW.

Once the arrays have been cleared and the flags set to zero, the first operation to be carried out by the separation logic is to identify a single PPCW and to store it in the array STRING(J). This is achieved in logic blocks 12-23 of FIG. 7A.

Proceeding first to instruction block 12, the program sets the variable J equal to "1". The program then determines if there is a character in an input data buffer register REG A (block 14). For the purpose of this disclosure, it is assumed that input characters have been placed one at a time in the buffer register REG A at a speed which is lower than the processing speed of the computer so that only one character is in register REG A at any given instant. If desired, the program can be revised to accept a previously stored listing, including a plurality of PPCWs with or without spaces between them. In such a case, the program may first divide the listing into separate PPCWs and then process each PPCW in the manner described below.

Returning to decision block 14, the program continues polling register REG A until the first character of a PPCW string appears in the register. At that time, the program proceeds to decision block 16 and determines if the character in register REG A is a space (as opposed to a letter of the alphabet). If it is not, the program proceeds to decision block 18 and sets the first element of the array STRING(J) (J is originally set equal to 1) equal to the numerical value of the PCA letter in REG A. The register REG A is then cleared (instruction block 20) and the variable J is increased by 1 (instruction block 22). The variable JMAX is also incremented so as to track the length of the PPCW that is ultimately loaded into STRING(J). The program then returns to decision block 14 and waits for a second character to be placed in the register REG A. If this character is not a space, it will be placed in the second element of STRING(J) since J has been increased to 2 in block 22. The program will continue looping through elements 14-23 until the character in register REG A is a space. Once this occurs, an entire PPCW will have been placed in STRING(J) with each character of the PPCW being stored in a consecutive element of STRING(J). The value of the variable JMAX, that is, the length of the PPCW, is also stored. Having completed the entry of a single PPCW into STRING(J), the program proceeds to decision block 24.

Having placed a PPCW in array STRING(J), the program must determine if the last character of the PPCW represents the retroflex ideogram, also referred to as the retroflex vowel. This is done in logic blocks 24-30. Proceeding to logic block 24, the program first determines if the final character in STRING(J) is the voweltone 79. If it is not, the final character in the PPCW does not represent the retroflex ideogram and the program can immediately proceed to decision block 32.

If the final character in STRING(J) is the voweltone 79, further investigation must be made to determine if it represents the retroflex ideogram. In accordance with the rules set forth above, voweltone 79 cannot be used as a semantic classifier. For this reason, it cannot follow a voweltone as part of a tone-syllable. If the voweltone 79 follows another voweltone, it must represent the retroflex vowel. Similarly, as shown in FIG. 4D, it cannot follow the consonants 1, 3, 4. 7-11 or 18 as part of a tone-syllable. (While the combinations 3-79 and 8-79 do form tone-syllables which occur in the Chinese language, to avoid ambiguity these are specifically excluded from those letter combinations which form permissible tone-syllables. See FIG. 4D.) Thus, if the voweltone 79 follows t either a vowel or one of the consonants 1, 3, 4, 7-11 or 18, it can unambiguously be determined that the voweltone 79 represents the retroflex vowel. The program examines the second to last character in STRING(J) in decision block 26 to determine if that character is a vowel (V) or one of the consonants $C' = 1, 3, 4, 7-11$ or 18. If it is not, the voweltone 79 does not represent the retroflex vowel and the program proceeds to decision block 32. If the second to last character in STRING(J) is a vowel (V) or one of the consonants $C'$, the voweltone 79 does represent the retroflex vowel. In this case, the last character in STRING(J) is set equal to zero and the retroflex vowel flag RV is set equal to 1 (see blocks 28 and 30).

Having determined whether the final character in STRING(J) represents the retroflex vowel, the first PCW of the PPCW string stored in STRING(J) must be identified. This is done in the subroutine consisting of logic blocks 32-76 (FIG. 7B).

As noted above, a PCW takes the generalized form TS+Q. A tone-syllable can take the form CSV, CV, SV or V and therefore can be either 1, 2 or 3 letters long. Since the generalized tone-syllable modifier Q is either zero or one letter long, the total PCW can be either 1, 2, 3 or 4 characters long. The actual length of the first tone-syllable in STRING(J) is determined in accordance with the subroutine of logic blocks 32-42.

Once this determination has been made, the length of the PCW can be unambiguously determined by examining the two characters immediately succeeding the tone-syllable. This is achieved in accordance with the subroutine of blocks 44-76. More particularly, these characters are examined to determine if they take any one of the forms CS, CV, SV or VP ($P = \phi$, C, V, Z, or S) which corresponds to the first two letters of the permissible tone-syllable forms CSV, CV, SV and VP. If they do take on the forms CS, CV, SV or VP, then these two letters define the beginning of a second tone-syllable in STRING(J), Q is equal to the null set, and the length of the PCW is equal to the length of the tone-syllable. If they do not take one of these forms, then Q is the generalized semantic classifier G, and the length of the PCW is equal to the length of the tone-syllable plus 1.

Turning to FIG. 7B, the subroutine for determining the length of the first tone-syllable in STRING (J) begins at decision block 32. The computer first determines if the first character of the PPCW located in STRING(J) is a semi-consonant. If it is, the tone-syllable must take the form SV and therefore has two letters. For this reason, the program proceeds to block 34 and sets the variable n=2. The variable n indicates the number of letters in the tone-syllable.

If the first element of STRING(J) is not a semi-consonant, the program proceeds to decision block 36 and determines if the first element of STRING(J) is a vowel. If it is, the tone-syllable consists of a V, and the variable n is set equal to 1 (block 38). If the first element in STRING(J) is neither a semi-consonant nor a voweltone, it must be a consonant. In such case, the tone-syllable can take the form CSV or CV, depending upon whether the second character in STRING(J) is a semiconsonant or a voweltone. To make this determination, the program proceeds to decision block 40 and determines if the second character in STRING(J) is a semiconsonant. If it is, the tone-syllable takes the form CSV and the variable n is set equal to 3 (block 42). If the second element is not a semi-consonant, the tone-syllable takes the form CV and the variable n is set equal to 2 (block 34).

Once the subroutine comprising blocks 32-42 has determined the number of characters in the tonesyllable and set the variable n equal to that number, a string n+2 characters long must be examined to determine whether the generalized tone-syllable modifier Q is equal to the null set or equal to G. This is done in the subroutine including blocks 44-76.

Beginning at instruction block 44, the program sets the variables $N=n+2$, $M=1$ and $J=1$. The variable N defines the number of characters which will be placed in the array SEG(M), the variable M defines the specific element of the array SEG(M) being examined and the variable J determines the specific element of the array STRING(J) being examined. Before the two characters immediately succeeding the tone-syllable can be examined, the first N characters of STRING(J) must be copied into the array SEG(M). This is done in accordance with logic blocks 46-50.

Once this has been completed, the program proceeds to the subroutine including decision blocks 52-76 wherein a determination is made as to whether the PCW includes n or n+1 characters (i.e. whether the generalized tone-syllable Q is a letter or the null set). This is achieved by looking at the last two characters in the array SEG(M) and determining whether the two characters take the form CS, CV, SV or VP and therefore which of those two characters is the first character of a second PCW in STRING(J). If the second to last character in array SEG(M) is the first character of a second piece of PCW in STRING(J), then it is not a semantic classifier and the length of the PCW is equal to the length of the tone-syllable. If the last character of the array SEG(M) is the first character of a second PCW in STRING(J), then the second to last character in SEG(M) is a semantic classifier. In such a case, the first PCW in STRING(J) is one character longer than the tone-syllable.

Beginning at instruction block 52, the program determines if the last character in SEG(M) is a voweltone (it should be remembered that the variable M has been increased to the value N in the subroutine encompassing blocks 46-50). If the last character in SEG(M) is a voweltone, a determination is made as to whether the second to last character in SEG(M) is a voweltone. If it is, an error condition exists (the entry rules of the PCL prevent a second PCW of a string from beginning in a voweltone). If an error condition exists, the program proceeds to instruction block 56 and enables a bell or other error indicator. The program then proceeds to instruction block 58 where the error flag E is set equal to 1 and the variable p is set equal to N. As will be described below, this will cause the entire string stored in SEG(M) to be displayed on the display screen so that the individual entering the PCW can examine it and determine where the entry mistake was made.

If the second to last character of SEG(M) is not a voweltone (block 54), the program proceeds to decision block 62 and determines if it is a zero consonant. If it is, the zero consonant flag Z is set equal to 1 and the variable p is set equal to n (blocks 64 and 65). If the second to last character is not a zero consonant, the program proceeds directly to instruction block 66 and the variable p is set equal to n. In either case, a determination has been made that the generalized tone-syllable modifier Q is equal to the null set and p has therefore been set equal to n. This identifies the PCW as being equal to the tone-syllable alone.

Returning to decision block 52, if the last character in SEG(M) is not a voweltone, the program determines if it is a semi-consonant (decision block 68). If it is, the program next determines if the second to last element in SEG(M) is a consonant (block 70). If it is, the second PCW begins with the second to last character in SEG(M) and the first PCW is therefore n characters long. For this reason, PCW length variable p is set equal to n (block 66). If the second to last character in SEG(M) is not a consonant, the semi-consonant located in the last position of SEG(M) is the beginning of the second PCW in STRING(J) and therefore the first PCW in STRING(J) is n+1 characters long. For this reason, the program proceeds to instruction block 76 wherein the PCW length variable p is set equal to n+1.

Returning to decision block 68, if the last character in SEG(M) is neither a voweltone nor a semiconsonant, it must be either a consonant or the zero consonant. In such a case, the first PCW in STRING(J) is n+1 characters long and the PCW length variable p is set equal to n+1 in instruction block 76. Before proceeding to instruction block 76, the program proceeds to decision block 72 to determine if the last character in SEG(M) is a zero consonant. If it is, the zero consonant variable Z is set equal to 1. As will be shown below, this will result in the zero consonant being removed from STRING(J) later in the program.

At this point, the program has unambiguously determined how many characters are in the first PCW in STRING(J). This PCW is then placed in the array PCW(X) in accordance with the subroutine comprising block 78-84.

Proceeding to decision block 86, the computer determines whether the error flag E is equal to 1. If it is, the program proceeds to instruction block 88 and displays information stored in SEG(M) on a display to enable the keyboard operator to determine what his or her entry error was.

If the error flag is not equal to 1, the program proceeds to instruction block 90. The computer will have a monosyllabic dictionary which uniquely equates each possible PCW to one and only one ideogram. The program looks at the ideogram identified by the PCW in array PCW(X) and displays this ideogram on the display.

At this point, the next procedure to be performed is to examine the next PCW in STRING(J) to identify its ideogram and display it on the display. As described above, the subroutine consisting of blocks 32-90 analyzes the first PCW indicated in STRING(J) and assumes that the letter located in the first element position of STRING(J) is the beginning of the first PCW in STRING(J). In order for the program to analyze the second PCW in STRING(J), each of the characters in STRING(J) must be shifted over to the left by a sufficient number of positions to ensure that the first letter of the second PCW in STRING(J) is located in the first element position of STRING(J). This procedure is carried out in blocks 92-104 of FIG. 7D.

As discussed above, a PCW length variable p is set in blocks 58-66 and 76 equal to the number of letters in the first PCW in STRING(J). The letters must be removed from STRING(J) in order for the program to evaluate the second PCW in STRING(J). One additional letter must be removed if the zero consonant has been used as a syllable-separating letter between the first and second PCWs in STRING(J). Two additional letters must be removed if an error condition was found to exist since p+2 letters have already been displayed on the display to enable the keyboard operator to determine his error and correct the same. This result is achieved in the subroutine comprising blocks 92-104 (see FIG. 7D).

Beginning with block 92, the program determines whether the zero consonant flag Z is set equal to 1. If it is, the PCW length variable p is set equal to p+1 and the program proceeds to instruction block 100. If the zero consonant flag is not set equal to 1, the program proceeds to decision block 96 and determines if the error flag is set equal to 1. If it is, the PCW length variable p is set equal to p+2 (block 98) and the program proceeds to instruction block 100. If the error flag is not set equal to 1, the program proceeds directly to instruction block 100.

In accordance with instruction block 100, the variable J is set equal to 1 and the program enters the loop including blocks 102-106. Each of the elements in STRING(J) is effectively moved to the left by p characters to insure that the first letter of the second PCW in STRING(J) is located in the first element position of STRING(J). At decision block 104, this process is continued as long as J is less than JMAX, which is set at block 23 to be the value J at which a space is first detected at decision block 16 (see FIG. 7A). Once this has been done, the program proceeds to instruction block 108 and determines if array STRING(J) is empty.

At this point in the program, the first PCW in STRING(J) has been analyzed and displayed and the letters in STRING(J) have been shifted to the left to place the first letter of the second PCW in STRING(J) in the first element position of STRING(J). If there are any additional PCWs in STRING(J) (block 108), the program returns to decision block 32 (FIG. 7B) and analyzes the first PCW now located in STRING(J) following the procedures described above. Once this PCW has been analyzed and displayed, the characters in STRING(J) are again be moved to the left to ensure that the first letter of the next PCW in STRING(J) is located in the first element position of STRING(J). This process is continued until all of the PCWs in STRING(J) have been evaluated and displayed (until STRING(J) is empty).

Once STRING(J) is empty, the program proceeds to decision block 110 and determines if the retroflex vowel flag RV is set equal to 1. If it is, the retroflex ideogram is displayed on the display (block 112) and the program returns to instruction block 10 to await the first element of the next PPCW string. If the retroflex vowel flag RV is not set equal to 1, the program proceeds immediately to block 10.

An important feature of the foregoing program (which is shown only by way of example) is that a string of PCA characters (preferably, but not necessarily, representing a PPCW), can automatically be divided into individual PCWs and then converted unambiguously into the appropriate ideograms utilizing a monosyllabic dictionary of PCWs to ideograms. This avoids the need for polysyllabic dictionaries and permits the PCL to follow the ideographic nature of the written Chinese language.

C. Alphagrammic Listing

Another major feature of the PCL is that it can be used to simply and directly create alphagrammic listings of both monosyllabic and polysyllabic words. An alphagrammic listing is one which is substantially in alphabetical order but also ensures that polysyllabic words or phrases beginning with the same ideograms are grouped together, even if a straight alphabetic ordering would separate these common ideograms. This can best be understood with reference to FIG. 8, which is an alphagrammic dictionary listing created utilizing the PCL of the present invention. In FIG. 8, the leftmost column comprises PPCWs, and the next column comprises the corresponding ideograms.

In any alphabetical representation of the Chinese language, the number of letters utilized to represent a given tone-syllable will vary as a function of the form of the tone-syllable (CSV, CV, SV or V). The use of a semantic classifier will also vary the number of letters in a PCW. A purely alphabetical listing would cause some Chinese compounds having the same first ideogram to be separated. For example, in FIG. 8, the words 人龟, 人鼠, and 人鳥 would be moved down to the position indicated by the dashed line, since the letter ʏ is assigned number 83 and the letter ҍ is assigned number 35. This would result in ideographic words in the second column having the same first ideogram being separated from one another.

The present invention avoids such a separation by utilizing a modified form of the separation logic described above to insert a virtual space between PCWs of a PPCW before sorting the PPCWs to be listed in alphagrammic order. The virtual space is assigned the number "0" and is therefore treated by the sorting routine as being a letter before the letter 1, and before all PCA letters.

Virtual spaces can be inserted by a modified form of the separation logic of FIGS. 7B-7D, particularly blocks 32-84 and 92-108. To use the separation logic for the purpose of inserting a virtual space into a PPCW to enable an alphagrammic listing, the separation logic can be modified as follows. Blocks 54-64 and blocks 72-74 are not required and can be removed. In lieu of the blocks 82-90 of the flow chart of FIG. 7C, the PCW stored in string PCW(X) can be placed in a holding array which holds the entire string of letters (this can be more than one PCW) into which a virtual space is being added. After the PCW is placed in the holding array, a virtual space is placed in the next element of the holding array. Thereafter, the program returns to block 92 and keeps looping through the separation logic until all of the PCWs of the string are placed in the holding array. At that point, the entire string is removed from the holding array and placed in mass-storage for subsequent sorting. When all of the strings to be sorted have been passed through the separation logic and placed in mass-storage, they are sorted in alphabetical order and the virtual space is treated as the letter preceding the letter 1. This will automatically generate the type of alphagrammic listing illustrated in FIG. 8.

As a further exception to purely alphabetical order, the alphagrammic listing should also keep together PCWs having the same tone. For example the word LMNV, where V is the silent vowel 27, should be followed by the word LMNV', where V' is the silent vowel 79, since LMNV and LMNV' are homotones both being pronounced with the first tone. The next two words listed should be, for example, LMNV" and LMNV'", where V" and V'" are the vowels 28 and 80, respectively. The latter two, words have the same sound as LMNV and LMNV', but are pronounced with the second tone. This is achieved as follows.

Figure 12A:
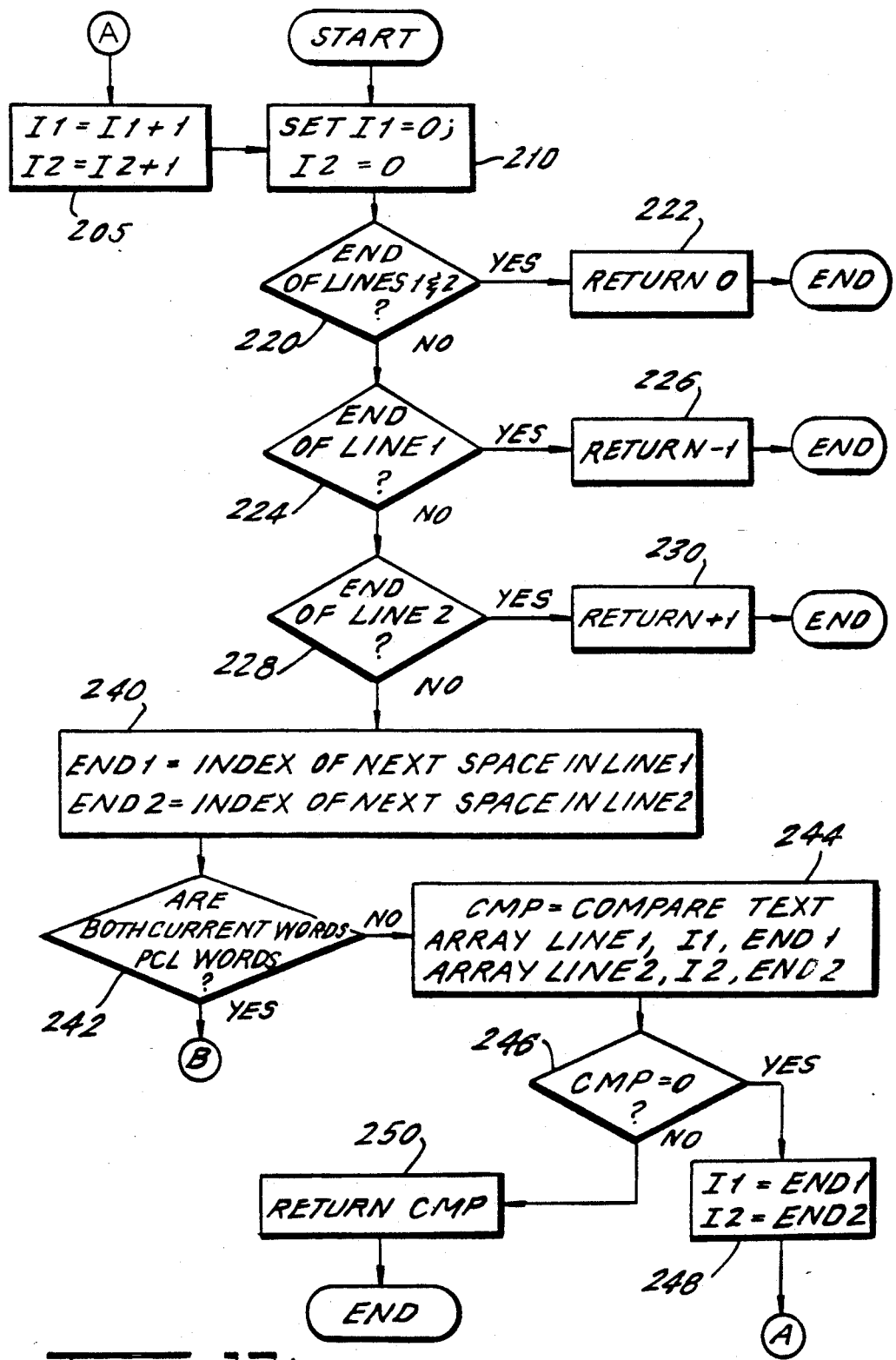
FIGS. 12A and 12B are flow diagrams illustrating a COMPARE routine for use in placing lines of PCL text in alphagrammic order.
Figure 12B:
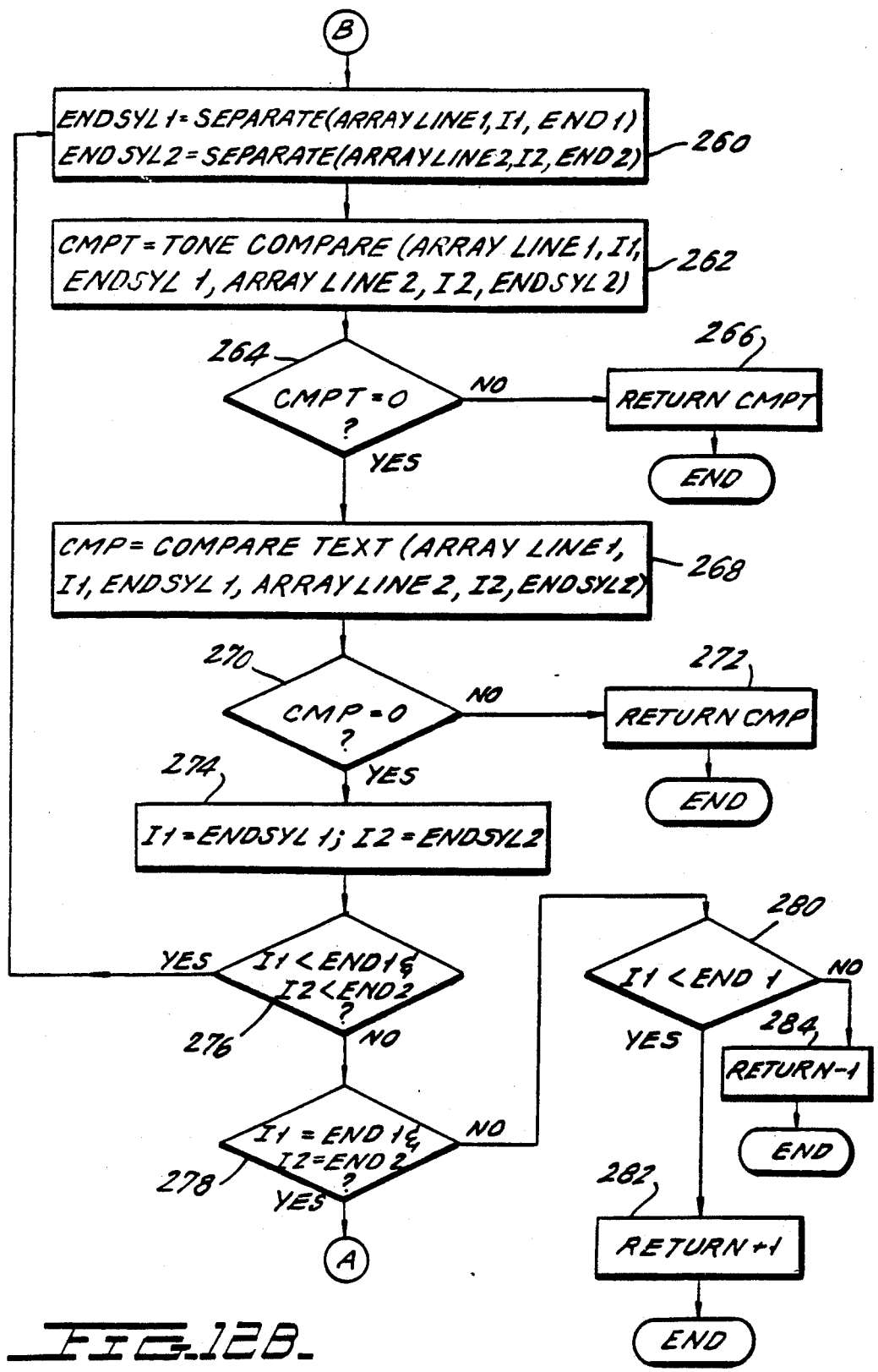

FIGS. 12A and 12B are flow diagrams illustrating a COMPARE routine for use in comparing pairs of PCL text lines, word-by-word or syllable-by-syllable, to determine which of the lines should be placed first in alphagrammic order. COMPARE has the further feature that English text lines are placed in normal alphabetical order. COMPARE is applied within an overall sorting procedure referred to herein as SORT, which rearranges the text lines after the COMPARE routine identifies the proper order.

Before applying COMPARE, an entire text file is loaded into a working memory. Each field containing a word, phrase, etc., to be ordered is placed on a separate line. The SORT program builds up an array of pointers to the beginning of each line of text; that is, an array containing the address of the first character of each line. The end of each line is also marked with a detectable character.

COMPARE receives the addresses of pairs of lines to be compared; that is, COMPARE has two arguments, ARRAYLINE1 and ARRAYLINE2, each of these arguments being an address from the array created by SORT. COMPARE processes the indicated lines at these addresses and returns a value which indicates whether they are in the correct order to form an alphagrammic listing. If the lines are found to be out of order, SORT preferably switches the pointers of the two lines, rather than the lines themselves.

In the following, the two lines to be compared by COMPARE will be referred to as Line 1 and Line 2. At block 210, COMPARE sets two counters I1=I2=0. I1 and I2 are indexes to the current character in the word or syllable being examined in Line 1 and Line 2, respectively. In this algorithm, I1 is ordinarily equal to I2, as discussed further below.

At blocks 220-230 it is determined whether data remains to be compared in both line 1 and line 2. If not, then either previous processing has reached the ends of both lines without detecting any difference, or else for some reason neither line contains any data. At decision block 220 it is determined whether end-of-line characters are detected for both of Lines 1 and 2. If so, then at instruction block 222 the COMPARE algorithm returns a value of 0. A value of 0 indicates that no difference has been detected between the two lines so as to require switching of address pointers. If it is not true that the ends of both Line 1 and Line 2 have been reached, then at decision block 224 it is determined whether the end of Line 1 has been reached. If so, then at 226 the routine returns −1, since Line 1 is shorter than Line 2 but is otherwise the same, and thus no switching is to be performed. If Line 1 has not ended, then at 228 it is determined whether Line 2 has ended. If so, a value of +1 is returned at 230. A returned value of +1 indicates that Line 1 and Line 2 are to be switched, since Line 2 is shorter than Line 1.

If neither line is determined to be shorter, then COMPARE examines the next word or syllable in Lines 1 and 2 to determine their proper alphagrammic order.

If it is not true that both words are PCL words, for example if one is an English word, then they are placed in order in steps 240-250. At instruction block 240, pointers END1 and END2 are set at the addresses of the spaces following the current words in Lines 1 and 2, respectively. By convention, words in the PCL are separated by spaces. Thus, spaces serve as convenient delimiters for a word-by-word comparison of the contents of Line 1 and Line 2. Multiple blanks, control codes, the zero consonant used as a syllable delimiter, and other irrelevant characters are ignored. I1 or I2 can be incremented to bypass such characters, in which case these two counters might not remain equal.

At decision block 242 the current words are examined to determine whether they are both words from the Phonetic Chinese Language. If not, then at block 244 a function COMPARETEXT is applied to the two current words. COMPARETEXT examines each character in the portion of Line 1 from the current position, indicated by I1, to the end position indicated by END1. Similarly, COMPARETEXT examines the content of Line 2 from I2 to END2. These two words are compared strictly alphabetically; for example, according to the standard ASCII or CSCII (see FIG. 13) sorting order. COMPARETEXT returns a value CMP, which equals 0, −1, or +1 accordless than, or greater than the word in Line 2, according to the usual lexical conventions.

At 246 it is determined whether CMP=0. If so, the current words are identical, and no switching is required. At 248 the routine advances to the next word by setting I1=END1 and I2=END2. Next, at block 205, I1 and I2 are each incremented by one to begin the examination of the next word.

If CMP does not equal 0, then at block 250, COMPARE returns CMP, that is, either −1 or +1, according to whether the Line 1 current word is less than or greater than that in Line 2. In the latter case the lines are to be switched.

If it is determined at decision block 242 that both current words are PCL words, that is, PCWs or PPCWs, then they must be compared syllable-by-syllable (ideogram-by-ideogram). This is carried out in steps 260-284.

Referring to FIG. 12B, at instruction block 260, the end of the first word, or the first syllable of the current PPCW, is found using the separation logic discussed previously. The SEPARATE subroutine returns values ENDSYL1 and ENDSYL2. ENDSYL1 represents the index of the end of the first syllable in Line 1 that occurs between I1 and END1. Similarly, ENDSYL2 is the index of the end of the next syllable in Line 2.

After the syllable ends have been found, then at block 262 the current syllables are compared with respect to tone. This is performed by a subroutine referred to as TONECOMPARE. TONECOMPARE is similar to COMPARETEXT, but is modified according to the rule described hereinabove that homotones must appear together in an alphagrammic listing, and further must be placed in alphabetical order with respect to one another. It also disregards final characters that could cause PPCWs having the same initial ideogram to be separated. One advantageous feature of TONECOMPARE is that it transforms all homotones of a given tone-syllable into a single predetermined form having the same particular pronunciation, and then applies COMPARETEXT.

TONECOMPARE returns a value CMPT, which is 0 if the current syllables are homotones, and is −1 or +1 according to whether the current syllable of Line 1 is less than or greater than the current syllable of Line 2. At block 264, if CMPT does not equal 0, then TONE-COMPARE returns the value CMPT at instruction block 266. If, however, CMPT is equal to 0, then the two current syllables are homotones and it must be determined whether they are in the correct order alphabetically. To accomplish this, COMPARE then applies the COMPARETEXT subroutine, described above, to the current syllables. In comparing PCL letters COMPARETEXT follows conventions similar to standard ASCII or CSCII (see FIG. 13) sorting. The system assigns digital values to PCL characters that are above the values assigned to the ASCII character set, so SORT places PCL letters alphabetically after English letters. At instruction block 268, COMPARETEXT returns a value CMP in a manner similar to that described above. At 270 it is determined whether CMP is equal to 0. If not, then at 272 COMPARE returns the value CMP, which is either −1 or +1.

If, however, CMP is equal to 0, then in addition to being homotones the two current syllables are alphabetically identical. At 274 the routine then advances to the next current syllable by setting I1=ENDSYL1 and I2=ENDSYL2.

At 276 the routine tests to determine whether the end of either word has been reached. That is, it is determined whether I1 is less than END1 as well as I2 being less than END2. If neither word is ended, then the system returns to block 260 to determine the end of the next two syllables in Lines 1 and 2 and to apply TONE-COMPARE.

If, however, at decision block 276 the end of one word has been reached, it is then determined at block 278 whether the ends of both words have been reached. If so, the routine passes to instruction block 205, where I1 and I2 are both incremented by one and the comparison of the next two current words is continued.

If it is determined at decision block 278 that the end of only one word has been reached, then at block 280 it is determined whether it is the end of the current word of Line 1 that has been reached. If not, that is if I1 is less than END1, then the current word in Line 1 is longer than the current word in Line 2 and the two lines should be switched. Accordingly, at block 282 the routine returns a value of +1. If, on the other hand, I1=END1, then it is the end of the current word in Line 1 that has been reached, so no switching is required. Accordingly, at block 284 a value of −1 is returned.

D. Keyboard

A keyboard which is particularly efficient in entering the PCA into a computer system, word processor, or the like, is illustrated in FIG. 10. The physical arrangement of the keyboard is identical to a standard QWERTY keyboard and the standard QWERTY symbols are shown in the left portion of each key position. The PCA letters which correspond to each key position are shown on the right side of each key. Two PCA letters are shown with respect to each key position. The upper right-hand letter corresponds to the uppercase position of the keyboard (where the shift key has been depressed) and the lower right-hand letter of each key position corresponds to the lowercase position of that key position. This keyboard arrangement maximizes the efficiency with which a typist or keyboard operator can enter PCL information into a data or word processing system.

There are many published studies concerning efficient keyboard layouts. Perhaps the most famous is entitled Typing Behavior, American Book Company, New York, 1936, by A. Dvorak et al. This study suggests that the placement of characters on a keyboard should be determined on a statistical basis so that the typist moves his fingers from the home keys (the keys "a, s, d, f, j, k, l, ;" on the QWERTY keyboard) as little as possible. To this end, the most frequently used group of keys are located in the home row (the third row of FIG. 10), the second most frequently used group of keys are located in the row immediately above the home row (the second row of FIG. 10), the third most frequently used group of keys are located in the row immediately below the home row (the fourth row of FIG. 10), and the least frequently used group of keys are located two rows above the home row (the top row of FIG. 10). Within each row, the most frequently used keys are the index finger keys, the second most frequently used keys are the middle finger keys, the third most frequently used keys are the ring finger keys and the fourth most frequently used keys are the little finger keys.

While the Dvorak system is usually the most efficient, it does not take into account the desirability of alternately typing with the left and right hand as much as possible. The keyboard of the present invention achieves this result by placing all of the consonants, and preferably all of the semi-consonants, on the right side of the keyboard so that they are typed by the right hand of the operator. The most frequently used voweltones are located on the left-hand side of the keyboard. Some voweltones must be located on the right-hand side of the keyboard since there are more voweltones than keys on the left-hand side of the keyboard. As used herein, the left-hand side of the keyboard refers to those keys to the left side of the dark lines in FIG. 10. These keys are struck with the left hand. The right-hand side of the keyboard refers to those keys of the keyboard located to the right of the dark lines in FIG. 10. These keys are struck by the right hand.

The present invention also determines where to place the letters of the keyboard as a function of the uppercase and lowercase conditions of the keyboard. Since the PCA contains 85 letters, they cannot all be placed on the lowercase of the keyboard. Only 43 can be placed on the lowercase of the keyboard. By selecting the particular letters shown in FIG. 10, 74% of the letters used based on frequency of usage are contained in the lowercase.

The keyboard of the present invention also determines the location of the letters on the keys as a function of the tones the voweltones carry. The most frequently occurring tone is tone 4, so the voweltones carrying the fourth tone are all located on the home row (row three of FIG. 10). The second most frequently used tone is tone 1, and all of the voweltones carrying this tone are located on the second row. The third most frequently used tone is tone 2, and all of the voweltones carrying tone 2 are located on the bottom row of the keyboard. The least frequently used tone is tone 3, and all tone-syllables carrying this tone are located in the top row of the keyboard.

To make it easier to learn the location of the letters on the keyboard, the keyboard of FIG. 10 also groups voweltone families together so that to a substantial extent all voweltones of a given family are entered using the same finger. Referring to FIG. 10, the voweltone family 47-50 are all typed by the left little finger, the voweltone family 51-54 are all typed by the left ring finger, the voweltone family 71-74 are all typed by the left middle finger, and so on.

What is claimed is:

1. A method of digitally encoding and storing the ideographic Chinese language in a computer, comprising the steps of:
   a) selecting a set of Chinese ideograms to be encoded and stored, each of said Chinese ideograms being pronounced as a monosyllable having a predetermined consonant sound, vowel sound, and vowel tone;
   b) selecting one and only one digital representation for each selected ideogram which is usable in said computer for outputting said ideograms;
   c) selecting a set of letters for a phonetic Chinese alphabet (PCA) which can be formed into phonetic Chinese words (PCWs) each comprising at least one such PCA letter, which fully identify the sound and tone pronunciation of such selected ideograms and distinguish between all homotone ideograms having identical sound and tone pronunciation in said selected set of Chinese ideograms;
   d) selecting one and only one digital representation for each PCA letter which is usable in said computer for outputting said PCA letter; and
   e) storing a monosyllabic dictionary in a computer memory in said computer which associates the digital representations of said ideograms and PCA letters so as to identify a one-to-one relationship between the respective digital representations of each selected ideogram and its corresponding PCW including distinguishing between all homotone ideograms having identical sound and tone pronunciation in said selected set of Chinese ideograms.

2. A method as in claim 1, wherein said PCA letters represent the following language elements:
   a) a plurality of vowels;
   b) a plurality of tones with which said vowels are pronounced; and
   c) a plurality of consonants.

3. A method of digitally encoding and storing the ideographic Chinese language in a computer, comprising the steps of:
   1)
      a) selecting a set of Chinese ideograms to be encoded and stored, each of said Chinese ideograms being pronounced as a monosyllable having a predetermined consonant sound, vowel sound, and vowel tone;
      b) selecting one and only one digital representation for each selected ideogram which is usable in said computer for outputting said ideogram;
      c) selecting a set of letters for a phonetic Chinese alphabet (PCA) which can be formed into phonetic Chinese words (PCWs) each comprising at least one such PCA letter, which fully identify the sound and tone pronunciation of such selected ideograms;
      d) selecting one and only one digital representation for each PCA letter which is usable in said computer for outputting said PCA letter; and
      e) storing a monosyllabic dictionary in a computer memory in said computer which associates the digital representations of said ideograms and PCA letters so as to identify a one-to-one relationship between the respective digital representations of each selected ideograms and its corresponding PCW;
   2) wherein said PCA letters represent the following language elements;
      a) a plurality of vowels;
      b) a plurality of tones with which said vowels are pronounced; and
      c) a plurality of consonants; and
   3) wherein said vowels include
      a) a plurality of voweltones, each of which represents a given vowel sound pronounced with a given tone, and
      b) a plurality of semi-consonants, each of which represents a given vowel sound irrespective of tone.

4. A method as in claim 3, wherein said plurality of tones includes four tones.

5. A method as in claim 4, wherein each of said voweltones comprises a base character and an indicia incorporated therein which indicates the tone.

6. A method of digitally encoding and storing the ideographic Chinese language in a computer, comprising the steps of:
   1)
      a) selecting a set of Chinese ideograms to be encoded and stored, each of said Chinese ideograms being pronounced as a monosyllable having a predetermined consonant sound, vowel sound, and vowel tone;
      b) selecting one and only one digital representation for each selected ideogram which is usable in said computer for outputting said ideogram;
      c) selecting a set of letters for a phonetic Chinese alphabet (PCA) which can be formed into phonetic Chinese words (PCWs) each comprising at least one PCA letter, which fully identify the sound and tone pronunciation of such selected ideograms;
      d) selecting one and only one digital representation for each PCA letter which is usable in said computer for outputting said PCA letter; and
      e) storing a monosyllabic dictionary in a computer memory in said computer which associates the digital representations of said ideograms and PCA letters so as to identify a one-to-one relationship between the respective digital representations of each selected ideogram and its corresponding PCW;
   2) wherein said PCA letters represent the following language elements;
      a) a plurality of vowels;
      b) a plurality of tones with which said vowels are pronounced; and
      c) a plurality of consonants; and
   3) wherein said consonants include
      a) a plurality of short consonants, each of which represents a respective consonant sound;
      b) a plurality of long consonants, each of which represents a respective consonant sound pronounced with a respective vowel sound; and
      c) a silent zero consonant.

7. A method of digitally encoding and storing the ideographic Chinese language in a computer, comprising the steps of:
   1)
      a) selecting a set of Chinese ideograms to be encoded and stored, each of said Chinese ideograms being pronounced as a monosyllable having a predetermined consonant sound, vowel sound, and vowel tone;

b) selecting one and only one digital representation for each selected ideogram which is usable in said computer for outputting said ideogram;

c) selecting a set of letters for a phonetic Chinese alphabet (PCA) which can be formed into phonetic Chinese words (PCWs) each comprising at least one PCA letter, which fully identify the sound and tone pronunciation of such selected ideograms;

d) selecting one and only one digital representation for each PCA letter which is usable in said computer for outputting said PCA letter; and e) storing a monosyllabic dictionary in a computer memory in said computer which associates the digital representation of said ideograms and PCA letters so as to identify a one-to-one relationship between the respective digital representations of each selected ideogram and its corresponding PCW;

2) wherein said PCA letters represent the following language elements;
  a) a plurality of vowels;
  b) a plurality of tones with which said vowels are pronounced; and
  c) a plurality of consonants;

3) wherein each such PCW has the form TS+Q, wherein
  a) TS is a tone-syllable having one of the forms CV, CSV, SV, and V; C being a consonant, S being a semi-consonant, and V being a voweltone; and
  b) Q is a generalized tone-syllable modifier which indicates meaning for distinguishing between homotones.

8. A method as in claim 7, wherein Q has one of the forms $\phi$ and G, wherein
  a) $\phi$ is the null set; and
  b) G is a generalized semantic classifier comprising a PCA letter added to the tone-syllable TS to the extend necessary for distinguishing between homotones.

9. A method as in claim 8, wherein G has one of the forms C, V, S and Z, wherein Z is the zero consonant.

10. A method as in claim 4, wherein a vowel sound "i" is represented by three groups of distinct PCA letters.

11. A method as in claim 10, wherein a vowel sound "u" and a vowel sound "ü" are each represented by two groups of distinct PCA letters.

12. A method as in claim 11, wherein the PCA can distinguish between 255 homotones for PCWs wherein the only vowel sound is "i", "u", or "ü"; 170 homotones for PCWs ending in the vowel sound "i"; and 85 homotones for all other PCWs.

13. A method as in claim 6, wherein said plurality of tones includes four tones; said vowels including a plurality of voweltones, each of which represents a given vowel sound pronounced with a given tone, and a plurality of semi-consonants, each of which represents a given vowel sound irrespective of tone; four of said voweltones respectively representing the four tones; and further representing the vowel sound "i" when they follow on of said short consonants.

14. A method as in claim 13, wherein four of said voweltones respectively represent the vowel sound "e" pronounced with said four tones; but represent the vowel sound "o" when they follow the sounds "b", "p", "m", and "f" and the semi-consonants.

15. A method as in claim 14, wherein four of said voweltones respectively represent the four tones; and further represent the vowel sound "er" when they are written alone or following the zero consonant; and further represent the vowel sound "i" when they follow the short consonants.

16. A method as in claim 9, comprising selecting a primary set of at least about 8000 ideograms which are those most frequently used in the Chinese language.

17. A method as in claim 16, wherein at least about 3900 ideograms of said primary set, which account for at least about 97 percent of usage, are uniquely identified by PCWs having one of the forms $TS+\phi$, $TS+V^*$, and $TS+Z$, $V^*$ being the same voweltone as that in the tone-syllable TS.

18. A method as in claim 17, wherein all of the remaining ideograms of the Chinese language are uniquely identified by PCWs having the form $TS+G$, where G is a PCA letter other than $V^*$ or Z.

19. A method as in claim 18, wherein at least about 80 percent of the remaining approximately 4100 ideograms of the primary set are each uniquely identified by employing a semantic classifier G which is a PCA letter similar to an ideographic radical having a meaning similar to that of the ideogram to be identified.

20. A method as in claim 1, wherein each PCW comprises no more than 4 PCA letters.

21. A method as in claim 20, wherein each PCW comprises a frequency-weighted average of 2.4 PCA letters.

22. A text processing method which includes digitally encoding and storing the ideographic Chinese language in a computer, comprising the steps of:

a) selecting a set of Chinese ideograms to be encoded and stored, each of said Chinese ideograms being pronounced as a monosyllable having a predetermined consonant sound, vowel sound, and vowel tone;

b) selecting one and only one digital representation for each selected ideogram which is usable in said computer for outputting said ideogram;

c) selecting a set of letters for a phonetic Chinese alphabet (PCA) which can be formed into phonetic Chinese words (PCWs) each comprising at least one such PCA letter, which fully identify the sound and tone pronunciation of such selected ideograms and distinguish between all homotone ideograms having identical sound and tone pronunciation in said selected set of Chinese ideograms;

d) selecting one and only one digital representation for each PCA letter which is usable in said computer for outputting said PCA letter;

e) storing a monosyllabic dictionary in a computer memory in said computer which associates the digital representations of said ideograms and PCA letters so as to identify a one-to-one relationship between the respective digital representations of each selected ideograms and its corresponding PCW including distinguishing between all homotone ideograms having identical sound and tone pronunciation in said selected set of Chinese ideograms;

entering a continuous string of phonetic Chinese language characters into said computer memory, said string of characters including at least two groups of characters, each group of characters defining a phonetic Chinese word of variable character length; and processing said continuous string in said computer memory so as to accurately determine the beginning and end of each phonetic Chinese word in said string.

23. A method as in claim 22, further comprising the step of referring to the stored monosyllabic dictionary to unambiquously determine the one and only one ideogram corresponding to each such phonetic Chinese word.

24. A method of creating an alphagrammic listing of a set of word strings, which includes digitally encoding and storing the ideographic Chinese language in a computer, the method comprising the steps of:
  a) selecting a set of Chinese ideograms to be encoded and stored, each of said Chinese ideograms being pronounced as a monosyllable having a predetermined consonant sound, vowel sound, and vowel tone;
  b) selecting one and only one digital representation for each selected ideogram which is usable in said computer for outputting said ideogram;
  c) selecting a set of letters for a phonetic Chinese alphabet (PCA) which can be formed into phonetic Chinese words (PCWs) each comprising at last one such PCA letter, which fully identify the sound and tone pronunciation of such selected ideograms and distinguish between all homotone ideograms having identical sound and tone pronunciation in said selected set of Chinese ideograms;
  d) selecting one and only one digital representation for each PCA letter which is usable in said computer for outputting said PCA letter;
  e) storing a monosyllabic dictionary in a computer memory in said computer which associates the digital representations of said ideograms and PCA letters so as to identify a one-to-one relationship between the respective digital representations of each selected ideogram and its corresponding PCW including distinguishing between all homotone ideograms having identical sound and tone pronunciation in said selected set of Chinese ideograms;
  each word string including a plurality of phonetic Chinese words, each phonetic Chinese word (PCW) representing one and only one Chinese ideogram and providing the sound and tone information required to pronounce that ideogram, and distinguishing between all homotone ideograms having identical sound and tone pronunciation in said selected set of Chinese ideograms, said PCA letters having a predetermined alphabetical order, said method of creating an alphagrammic listing comprising the steps of:
  1) storing said set of word strings in the computer memory; and
  2) sorting said set of word strings in alphagrammic order, wherein
  3) said word strings are listed in the alphabetical order of the characters in that word string;
  4) said alphabetical order being overridded to the extend that;
    (a) all strings whose corresponding first Chinese ideograms are identical are listed together for purposes of ordering said strings; and
    (b) all words in said word strings pronounced with the same sound and tone are listed together for purposes of ordering said strings;
  5) all strings listed together in said steps (a) and (b) being listed in alphabetical order with respect to one another.

25. A method of processing character strings, comprising
  a) entering a string of letters of a phonetic Chinese alphabet (PCA) in a computer memory; wherein
    1) said PCA includes respective pluralities of voweltones (V), semi-consonants (S), and consonants (C), and including a zero consonant (Z);
    2) said string of letters includes at least two separate phonetic Chinese words (PCWs), each said PCW having the form TS+Q, wherein TS is a tone-syllable having one of the forms CV, CSV, SV and V, and Q is a generalized meaning-indicating modifier having one of two forms, namely a PCA letter and the omission of any PCA letter; provided that Q cannot take the form of one voweltone (RV) which is employed to indicate the retroflex ideogram when it occurs at the end of a character string;
    3) each of said PCWs represents one and only one Chinese ideogram and provides the sound and tone information required to pronounce that ideogram; and
    4) each non-initial PCW that has the form V+Q is preceded in such string by the zero consonant, and each noninitial PCW that has the form SV+Q is preceded in such string by the zero consonant whenever such last-mentioned PCW follows a PCW having one of the forms CVC and CSVC; and
  b) separating said string in said computer memory unambiguously into said separate phonetic Chinese words included therein.

26. A method as in claim 25, further comprising a step of referring to a stored monosyllabic dictionary to unambiguously determine the ideogram corresponding to each such phonetic Chinese word.

27. A method as in claim 25, further comprising
  a) defining a predetermined alphabetical order for said PCA letters;
  b) entering at least two of said strings of PCA letters in a computer memory; and
  c) sorting said strings in said computer memory in alphagrammic order wherein
    1) said strings are listed in the alphabetical order of the letters in that string,
    2) said alphabetical order being overridden to the extent that
      i) all strings whose corresponding first Chinese ideograms are identical are listed together for purposes of alphabetization, and
      ii) all PCWs in said strings pronounced with the same sound and tone are listed together for purposes of alphabetization of said strings; all strings listed together in said steps (2) (i) and (2) (ii) being listed in alphabetical order with respect to one another.

28. A method of encoding and storing Chinese ideograms in a computer, comprising the steps of:
  a) selecting a set of Chinese ideograms to be encoded and stored, each of said Chinese ideograms being pronounced as a monosyllable having a predetermined consonant sound, vowel sound, and vowel tone;

b) selecting a set of letters for a phonetic Chinese alphabet (PCA) which can be formed into phonetic Chinese words (PCWs) each comprising at least one such PCA letter, which fully identify the sound and tone pronunciation of such selected ideograms;

c) selecting one and only one 7-bit digital representation for each selected PCA letter and each selected ideogram which are usable in said computer for outputting said ideograms and said PCA letters;

d) selecting one and only one phonetic Chinese word (PCW) composed of PCA letters for uniquely identifying each selected ideogram; and e) storing a monosyllabic dictionary in a computer memory in said computer which associates the digital representations of said ideograms and PCA letters so as to identify a one-to-one relationship between the respective digital representations of each selected ideograms and its corresponding PCW, including distinguishing between all homotone ideograms having identical sound and tone pronunciation in said selected set of Chinese ideograms.

29. A method as in claim 28, wherein said 7-bit digital representation for each PCA letter is within the range 80H-FFH.

30. A method as in claim 29, wherein said 7-bit digital representation is within the range 80H-DFH.

31. A method as in claim 28, wherein said 7-bit digital representation is within the range 81H-DEH.

32. A method as in claim 24, further comprising the step of referring to the stored monosyllabic dictionary to unambiguously determine the one and only one ideogram corresponding to each such phonetic Chinese word.

33. A method as in claim 25, further comprising digitally encoding and storing the ideographic Chinese language in said computer by the steps of:

a) selecting a set of Chinese ideograms to be encoded and stored, each of said Chinese ideograms being processed as a monosyllable having a predetermined consonant sound, vowel sound, and vowel tone;

b) selecting one and only one digital representation for each selected ideogram which is usable in said computer for outputting said ideogram;

c) selecting a set of letters for a phenolic Chinese alphabet (PCA) which can be formed into phonetic Chinese words (PCWs) each comprising at least one such PCA letter, which fully identify the sound and tone pronunciation of such selected ideograms and distinguish between all homotone ideograms having identical sound and tone pronunciation in said selected set of Chinese ideograms;

d) selecting one and only one digital representation for each PCA letter letter which is usable in said computer for outputting said PCA letter; and e) storing a monosyllabic dictionary in a computer memory in said computer which associates the digital representations of said ideograms and PCA letters so as to identify a one-to-one relationship between the respective digital representations of each selected ideogram and its corresponding PCW including distinguishing between all homotone ideograms having identical sound and tone pronunciation in said selected set of Chinese ideograms.

* * * * *